(12) United States Patent
Berliner et al.

(10) Patent No.: US 11,405,128 B2
(45) Date of Patent: Aug. 2, 2022

(54) MINIMIZING BLOCK ERROR RATE (BLER) ASSOCIATED WITH A BEAM SWITCH

(71) Applicant: QUALCOMM Incorporated, San Diego, CA (US)

(72) Inventors: Ran Berliner, Kfar-Aviv (IL); Shay Landis, Hod Hasharon (IL); Igor Gutman, Ramat Gan (IL); Gideon Shlomo Kutz, Ramat Hasharon (IL)

(73) Assignee: QUALCOMM Incorporated, San Diego, CA (US)

(*) Notice: Subject to any disclaimer, the term of this patent is extended or adjusted under 35 U.S.C. 154(b) by 56 days.

(21) Appl. No.: 16/528,457

(22) Filed: Jul. 31, 2019

(65) Prior Publication Data

US 2021/0036800 A1    Feb. 4, 2021

(51) Int. Cl.
*H04L 1/00* (2006.01)
*H04W 36/06* (2009.01)

(52) U.S. Cl.
CPC .......... *H04L 1/0003* (2013.01); *H04L 1/0009* (2013.01); *H04L 1/0033* (2013.01); *H04W 36/06* (2013.01)

(58) Field of Classification Search
CPC ........ H04B 7/043; H04B 7/0695; H04B 7/04; H04B 10/516; H04B 1/401; H04W 36/06; H04L 1/0009; H04L 1/0033; H04L 1/0003
See application file for complete search history.

(56) References Cited

U.S. PATENT DOCUMENTS

| 10,700,760 | B1 | 6/2020 | Berliner |
| 2009/0156130 | A1 | 6/2009 | Wang et al. |
| 2014/0071838 | A1 | 3/2014 | Jia et al. |
| 2014/0369328 | A1 | 12/2014 | Park et al. |
| 2019/0104549 | A1 | 4/2019 | Deng et al. |
| 2019/0141742 | A1* | 5/2019 | Zhou .................. H04W 72/048 |
| 2019/0215039 | A1 | 7/2019 | Gao et al. |
| 2019/0222279 | A1* | 7/2019 | Xi .......................... H04W 72/00 |
| 2020/0015213 | A1 | 1/2020 | Tang |
| 2020/0037385 | A1 | 1/2020 | Park et al. |
| 2020/0137591 | A1* | 4/2020 | Smith ............... H04W 72/0446 |
| 2020/0145080 | A1* | 5/2020 | Tang ..................... H04B 7/088 |

FOREIGN PATENT DOCUMENTS

WO    2018204255 A1    11/2018

OTHER PUBLICATIONS

Wang et al, "Performance Analysis of Interference Averaging for Link Adaptation in LTE/LTE-A Downlink", 2013 (Year: 2013).*
International Search Report and Written Opinion—PCT/US2020/039835—ISA/EPO—dated Sep. 11, 2020.

* cited by examiner

*Primary Examiner* — Omer S Mian

(74) *Attorney, Agent, or Firm* — Quarles & Brady LLP

(57) ABSTRACT

Aspects of the disclosure relate to minimizing the block error rate (BLER) experienced by a user equipment (UE) upon a downlink beam switch at the base station. The base station may mitigate the link adaptation convergence transient upon performing a beam switch by modifying the modulation and coding scheme (MCS) according to a difference in reference signal received power (RSRP) between the old beam and the new beam. The base station may further adjust the MCS utilizing an outer-loop link adaptation process or channel state feedback (CSF) provided by the UE after the beam switch. Other aspects, features, and embodiments are also claimed and described.

30 Claims, 17 Drawing Sheets

MINIMIZING BLOCK ERROR RATE (BLER) ASSOCIATED WITH A BEAM SWITCH

CROSS-REFERENCE TO RELATED APPLICATION

This patent application is related to concurrently filed, co-pending U.S. Non-Provisional application Ser. No. 16/528,451, filed on the same day as this application, which is incorporated herein by reference as if fully set forth below.

TECHNICAL FIELD

The technology discussed below relates generally to wireless communication networks, and more particularly, to adjusting transmission and reception characteristics associated with a beam switch (e.g., after a beam switch) in beam-based communication scenarios (e.g., milli-meter wave beams). Some embodiments and techniques enable and provide communication devices, methods, and systems with techniques for minimizing block error rate (sometimes abbreviated as BLER) associated with performing a beam switch (e.g. before, during, or after a beam switch).

INTRODUCTION

In wireless communication systems, such as those specified under standards for 5G New Radio (NR), a base station and user equipment (UE) may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference.

As the demand for mobile broadband access continues to increase, research and development continue to advance beamforming communication technologies, including technologies for enhancing beamforming management in particular, not only to meet the growing demand for mobile broadband access, but to advance and enhance the user experience with mobile communications.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to minimizing block error rate (BLER) experienced by a user equipment (UE) in beam-based communication scenarios. BLER can be minimized upon a downlink beam switch at a base station. As one example, a base station may mitigate link adaptation convergence transient issues upon performing a beam switch by modifying a modulation and coding scheme (MCS). Modification can be done according to a difference in reference signal received power (RSRP) measurements of various beams (e.g., between an existing or old beam and a new or expected beam). The MCS modification may occur soon after after a beam switch to minimize the BLER at the UE (e.g., in a first slot after a beam switch). In some examples, the base station may further adjust the MCS utilizing an outer-loop link adaptation process or channel state feedback (CSF) provided by the UE after the beam switch. Disclosed aspects include a variety of method, system, device, and apparatus embodiments.

In one example, a method for wireless communication at a base station in a wireless communication network is disclosed. The method can include communicating with a user equipment (UE) utilizing a first downlink beam of a plurality of downlink beams and switching from the first downlink beam to a second downlink beam of the plurality of downlink beams to communicate with the UE. Switching can occur based on a difference in measured or observed power reference signal levels (e.g., between a first reference signal received power (RSRP) associated with the first downlink beam and a second RSRP associated with the second downlink beam). The method may also include modifying a modulation and coding scheme (MCS) utilized for communication with the UE based on the difference between the first RSRP and the second RSRP.

Another example provides a base station in a wireless communication network including a wireless transceiver, a memory, and a processor communicatively coupled to the wireless transceiver and the memory. The processor can be configured to communicate with a user equipment (UE) utilizing a first downlink beam of a plurality of downlink beams and switch from the first downlink beam to a second downlink beam of the plurality of downlink beams to communicate with the UE. Switching can occur based on a difference in measured or observed power reference signal levels (e.g., between a first reference signal received power (RSRP) associated with the first downlink beam and a second RSRP associated with the second downlink beam). The processor can also be configured to modify a modulation and coding scheme (MCS) utilized for communication with the UE based on the difference between the first RSRP and the second RSRP.

Another example provides a base station in a wireless communication network.

The base station can include means for communicating with a user equipment (UE) utilizing a first downlink beam of a plurality of downlink beams and means for switching from the first downlink beam to a second downlink beam of the plurality of downlink beams to communicate with the UE. Switching can occur based on a difference in measured or observed power reference signal levels (e.g., between a first reference signal received power (RSRP) associated with the first downlink beam and a second RSRP associated with the second downlink beam). The base station can also include means for modifying a modulation and coding scheme (MCS) utilized for communication with the UE based on the difference between the first RSRP and the second RSRP.

Another example provides a non-transitory computer-readable medium including code for causing a base station to communicate with a user equipment (UE) utilizing a first downlink beam of a plurality of downlink beams and switch from the first downlink beam to a second downlink beam of the plurality of downlink beams to communicate with the UE. Switching can occur based on a difference in measured or observed power reference signal levels (e.g., between a first reference signal received power (RSRP) associated with the first downlink beam and a second RSRP associated with the second downlink beam). The non-transitory computer-readable medium can also include code for causing the base station to modify a modulation and coding scheme (MCS) utilized for communication with the UE based on the difference between the first RSRP and the second RSRP.

Various method, system, device, and apparatus embodiments may also include additional features. For example, the first downlink beam and the second downlink beam may have the same or different widths. In addition, the base station may communicate with the UE utilizing a millimeter wave carrier frequency.

In some examples, the base station may further be configured to receive at least one beam measurement report the UE, where each of the first RSRP and the second RSRP are included in one of the at least one beam measurement report. The base station may further be configured to calculate the difference between the first RSRP and the second RSRP based on the beam measurement report. In other examples, the base station may further be configured to estimate the difference between the first RSRP and the second RSRP based on respective signal quality measurements of a first uplink beam corresponding to the first downlink beam and a second uplink beam corresponding to the second downlink beam.

In some examples, the base station may be configured to adjust the MCS utilizing an outer-loop link adaptation process. For example, the base station may be configured to receive acknowledgement information from the UE and adjust the MCS based on the acknowledgement information. In other examples, the base station may be configured to transmit a channel state information-reference signal (CSI-RS) to the UE via the second beam, receive channel state feedback (CSF) from the UE, and adjust the MCS based on the CSF.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
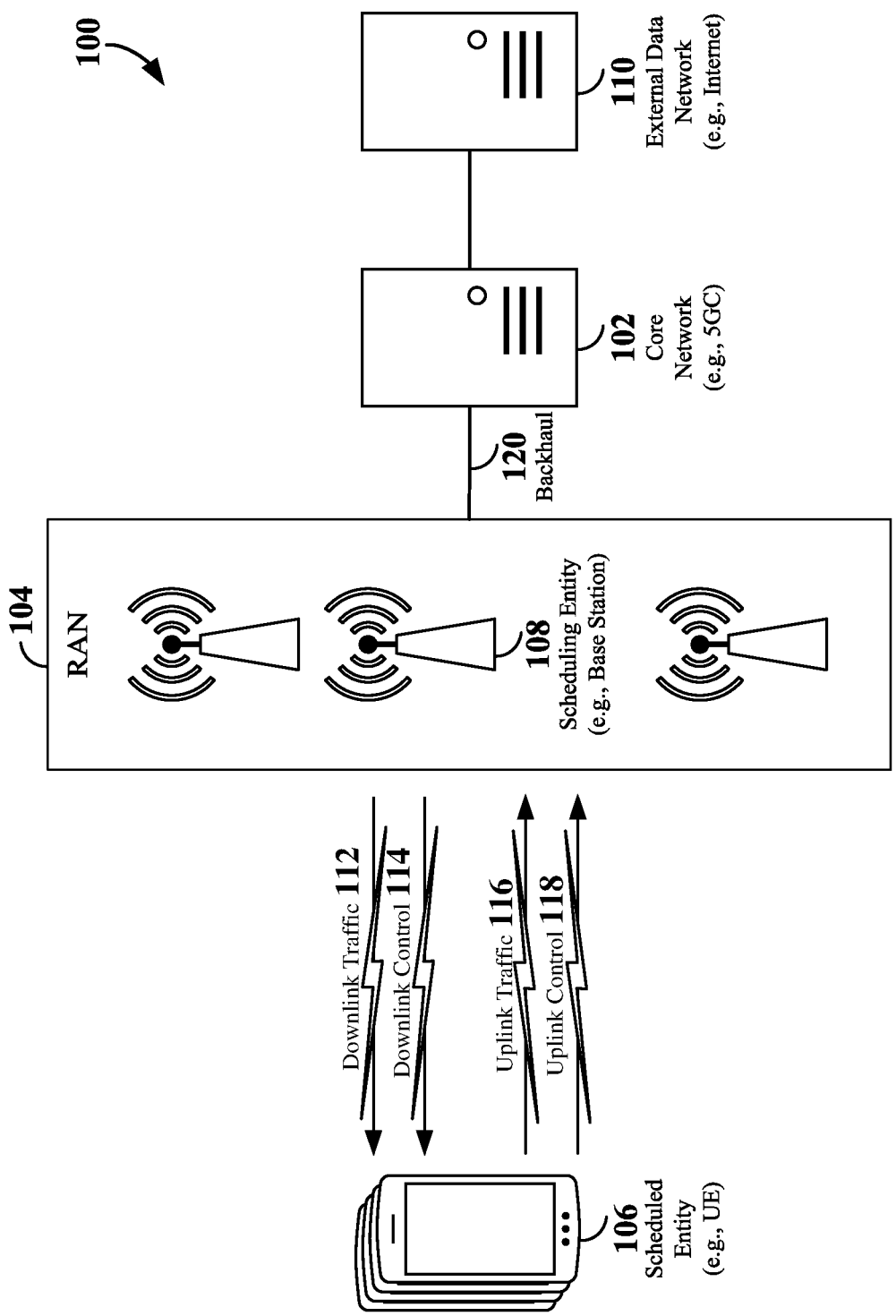
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
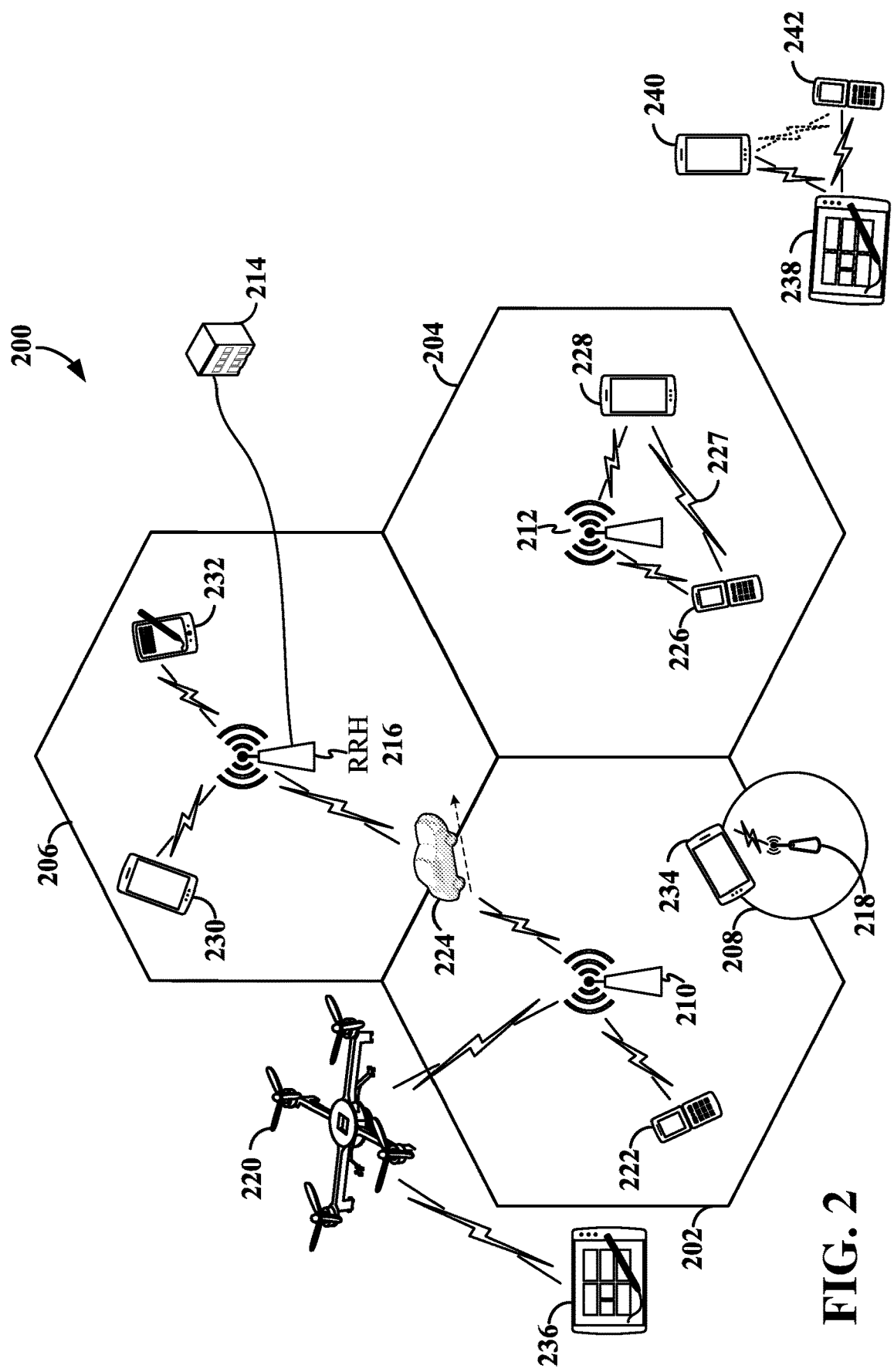
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may each function as a scheduled entity or a non-primary (e.g., secondary) sidelink device. In still another example, a UE may function as a scheduling entity or scheduled entity in a device-to-device (D2D), peer-to-peer (P2P), vehicle-to-vehicle (V2V) network, vehicle-to-everything (V2X) and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
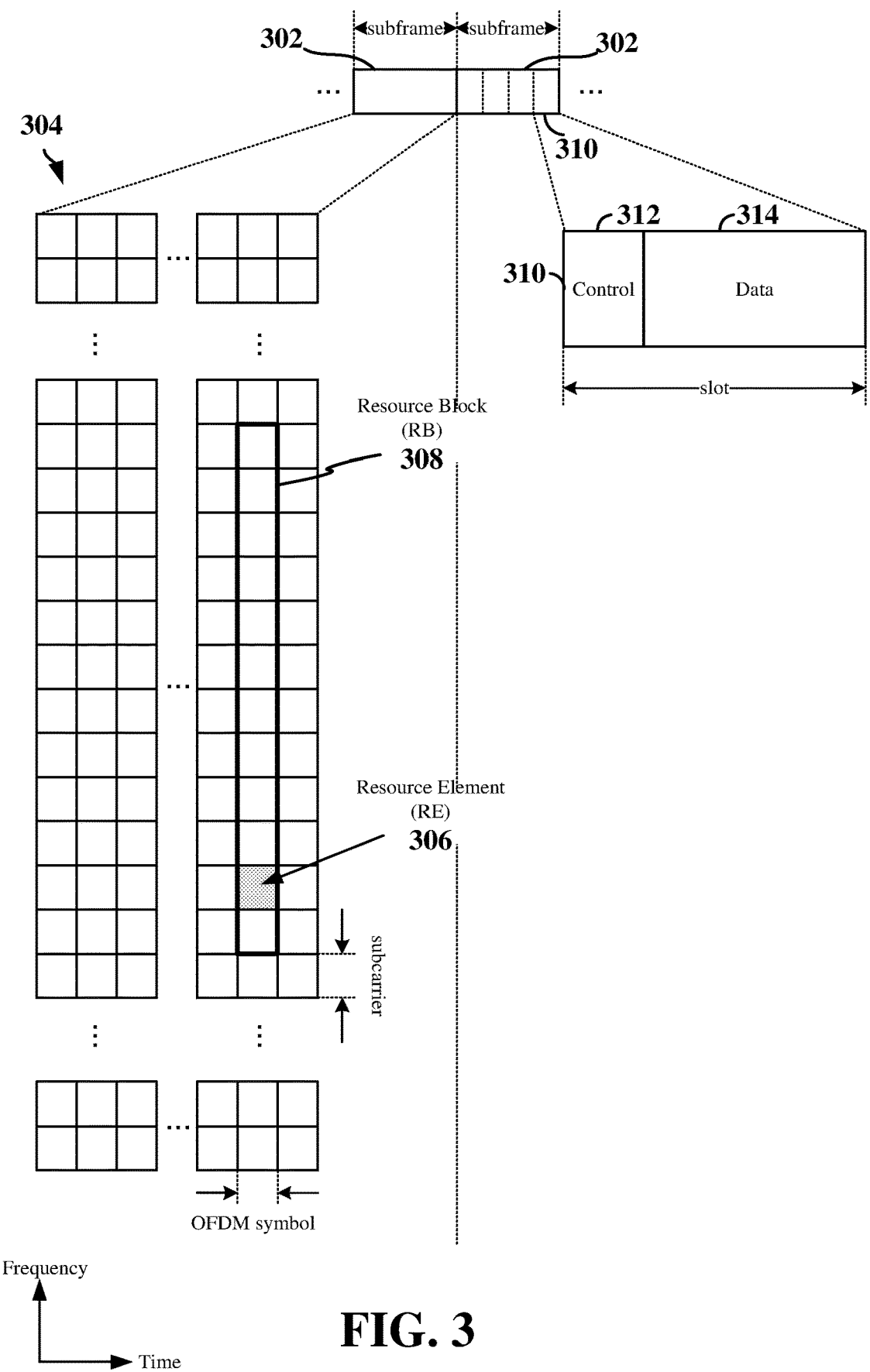
FIG. 3 is a diagram illustrating an example of a frame structure for use in a radio access network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
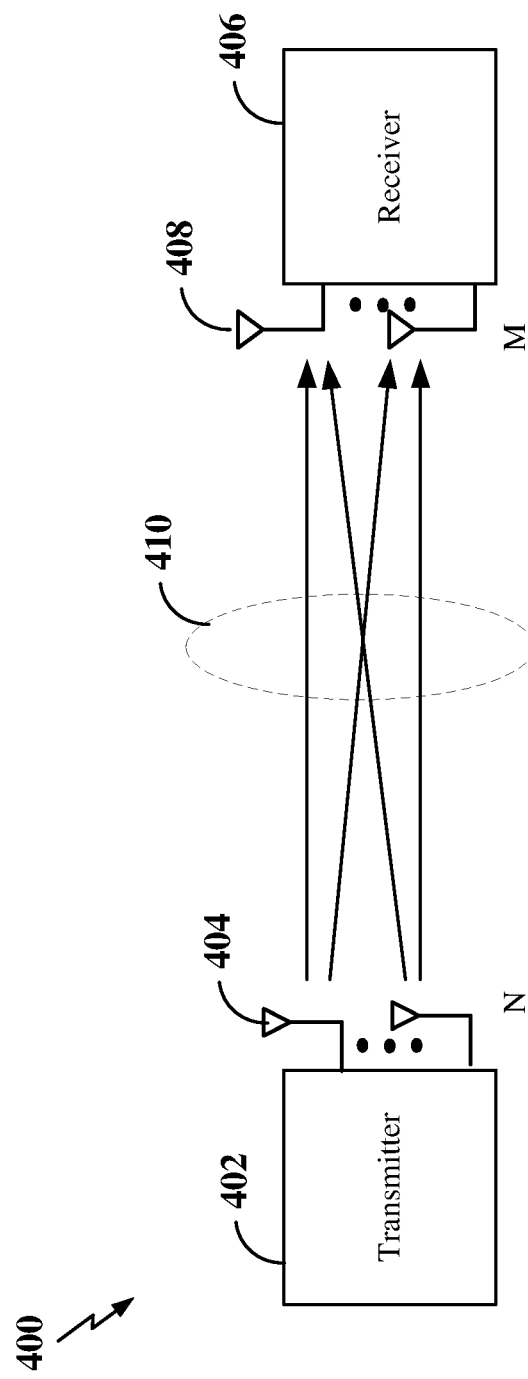
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using beams of varying beam widths. For example, a base station may be configured to utilize a wider beam when communicating with a UE that is in motion and a narrower beam when communicating with a UE that is stationary. In some examples, to select a particular beam for communication with a UE, the base station may transmit a reference signal, such as a synchronization signal block (SSB) or channel state information reference signal (CSI-RS), on each of a plurality of beams in a beam-sweeping manner. The UE may measure the reference signal received power (RSRP) on each of the beams and transmit a beam measurement report to the base station indicating the RSRP of each of the measured beams. The base station may then select the particular beam for communication with the UE based on the beam measurement report. In other examples, when the channel is reciprocal, the base station may derive the particular beam to communicate with the UE based on uplink measurements of one or more uplink reference signals, such as a sounding reference signal (SRS).

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the master system information block (MSIB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub 6 GHz systems.

Figure 5:
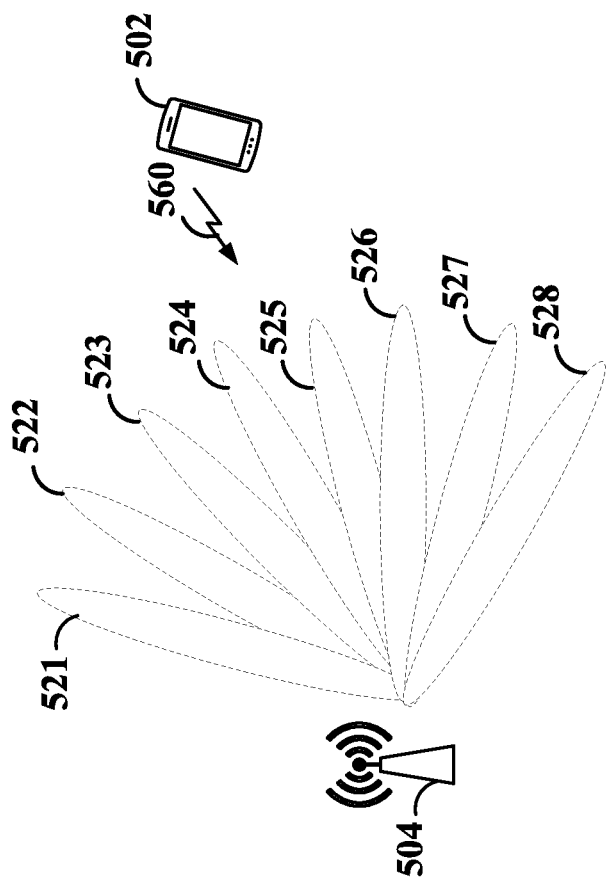
FIG. 5 is a diagram illustrating an example of communication between a base station and a user equipment (UE) using beamforming according to some aspects.

FIG. 5 is a diagram illustrating communication between a base station (BS) 504, such as a gNB, and a UE 502 using downlink beamformed signals according to some aspects of the disclosure. The base station 504 may be any of the base stations or scheduling entities illustrated in FIGS. 1 and 2, and the UE 502 may be any of the UEs or scheduled entities illustrated in FIGS. 1 and 2. It should be noted that while some beams are illustrated as adjacent to one another, such an arrangement may be different in different aspects. In some examples, beams transmitted during a same symbol may not be adjacent to one another. In some examples, the BS 504 may transmit more or less beams distributed in all directions (e.g., 360 degrees).

In the example shown in FIG. 5, a beam set contains eight different beams 521, 522, 523, 524, 525, 526, 527, 528, each associated with a different beam direction. In some examples, the BS 504 may be configured to sweep or transmit each of the beams 521, 522, 523, 524, 525, 526, 527, 528 during a synchronization slot. For example, the BS 504 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control—control element (MAC-CE) signaling by the gNB), or aperiodically (e.g., as triggered by the gNB via downlink control information (DCI)).

The UE 502 utilizes the received beam reference signals to identify the beams and perform received power measurements (e.g., RSRP) on the beam reference signals. The UE 502 may then transmit a beam measurement report 560 the respective beam index and RSRP of each beam 521-528. The BS 504 may then determine the downlink beam (e.g., beam 524) on which to transmit unicast downlink control information and/or user data traffic to the UE 502 with the highest gain from the beam measurement report 560. Transmission of the beam measurement report 560 may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

In other examples, when the channel is reciprocal (e.g., the downlink and uplink channel qualities are the same), the BS 504 may derive a downlink beam. Derivation can be based on the UE 502's uplink measurements, such as by measuring the received power, quality, or other variable of a sounding reference signal (SRS) or other uplink reference signal. In some examples, a UE may not transmit a beam measurement report 560 to the BS 504. In some examples, the BS 504 may select a pair of beams (e.g., a downlink transmit beam associated with the BS 504 and a downlink reception beam associated with the UE 502) as a beam pair link (BPL) based on the received beam measurement report 560 and/or uplink measurements.

When the BS 504 switches from one downlink beam to another downlink beam, the BS 504 may perform link adaptation. Link adaptation can adjust a modulation and coding scheme (MCS). Adjustment may occur with respect to a link budget associated with a new downlink beam. In some examples, the BS 504 may utilize an outer-loop link adaptation process in which the MCS may be modified based on the HARQ feedback (e.g., ACKs and NACKs) from the UE 502. In other examples, the BS 504 may dynamically schedule the transmission of a CSI-RS to the UE 502 on the new downlink beam. From the CSI-RS, the UE 502 may measure the channel quality and provide channel state feedback (CSF) to the BS 504. The CSF may include, for example, a channel quality indicator (CQI) from which the BS 504 may select/adjust the MCS utilized for unicast transmissions to the UE 502 on the new downlink beam. Upon selecting/adjusting the MCS, the BS 504 may then further utilize an outer-loop link adaptation process to further modify the MCS, as needed, until another CSI-RS is transmitted to the UE 502.

Although the dynamic transmission of the CSI-RS to the UE 502 may result in a faster MCS adjustment than the outer-loop link adaptation process, in either scenario, the beam switch is followed by a link adaptation convergence period in which the link may suffer from a block error rate (BLER) burst when moving to a beam with a lower spectral efficiency or the link may suffer from lower throughput when moving to a beam with higher spectral efficiency.

Moreover, when the beams are quasi-co-located (or QCL'd), the BS 504 may not signal to the UE 502 that the BS 504 is switching beams. This may result in the UE 502 experiencing a sudden increase in received signal strength, which may increase the BLER at the UE 502. For example, when the BS 504 switches from a wide beam to a narrow beam, the antenna gain difference between the wide beam and the narrow beam may be significant, resulting a large received signal strength jump at the UE 502.

In various aspects of the disclosure, to minimize the BLER after performing a downlink beam switch from a current downlink beam to a new downlink beam, the BS 504 may mitigate the link adaptation convergence period. Mitigation can occur by adjusting the MCS according a difference in RSRP between a current beam and a new beam. In some examples, the difference in RSRP may be discerned from the beam measurement report 560 sent from the UE 502 to the BS 504. In other examples, channel reciprocity may be leveraged, where the BS 504 may derive the difference in RSRP from uplink measurements on corresponding uplink beams associated with the BS 504. For example, the BS 504 may compare the uplink channel quality (e.g., received power) measured on a previous uplink beam corresponding to the previous downlink beam at the BS 504 prior to the beam switch with the uplink channel quality (e.g., received power) measured on a new uplink beam corresponding to the new downlink beam at the BS 504 after the beam switch.

By adjusting the MCS based on the difference in RSRP, an initial change in the MCS may be applied in a first slot after the beam switch, which reduces the convergence time for outer-loop link adaptation. In addition, the BLER during the convergence period may be reduced when moving to a beam with a lower RSRP. In examples in which CSF is used for link adaptation, performing an initial adjustment to the MCS based on the difference in RSRP optimizes the link adaptation until the first CSF is reported by the UE 502.

In other aspects of the disclosure, to minimize the BLER at the UE 502 upon a downlink beam switch, the UE 502 may modify an automatic gain control (AGC) state of the UE. Modification can be based on the difference in RSRP between a current downlink beam and an expected downlink beam. In some example, an expected downlink beam may be a beam that expected to be selected by the BS 504 for subsequent downlink transmissions to the UE 502 (e.g., unicast transmissions). The UE 502 may identify the expected downlink beam based on RSRP measurements made by the UE 502 during the synchronization slot (e.g., during a beam sweep). In some examples, the expected downlink beam may have a highest RSRP among all of the measured RSRPs of the different downlink beams. In other examples, the expected downlink beam may have a lower RSRP or be grouped into a range of desired RSRP levels. Expected downlink beams may be selected based on a variety of criteria (e.g., power, timing, signal quality, channel conditions, beam type, polarization, operating conditions, etc.). The UE 502 may further apply a slow attenuation to the AGC state to converge back to the nominal value of the current downlink beam in circumstances in which the BS 504 does not switch beams.

By modifying the AGC state prior to beam switch based on an expected downlink beam, the AGC step response latency may be reduced to near zero and the AGC may be in an optimal state in the first slot after the beam switch. As a result, the BLER experienced by the UE may be minimized when switching from a wide beam to a narrow beam or, more generally, from a beam with lower RSRP to a beam with higher RSRP.

Figure 6:
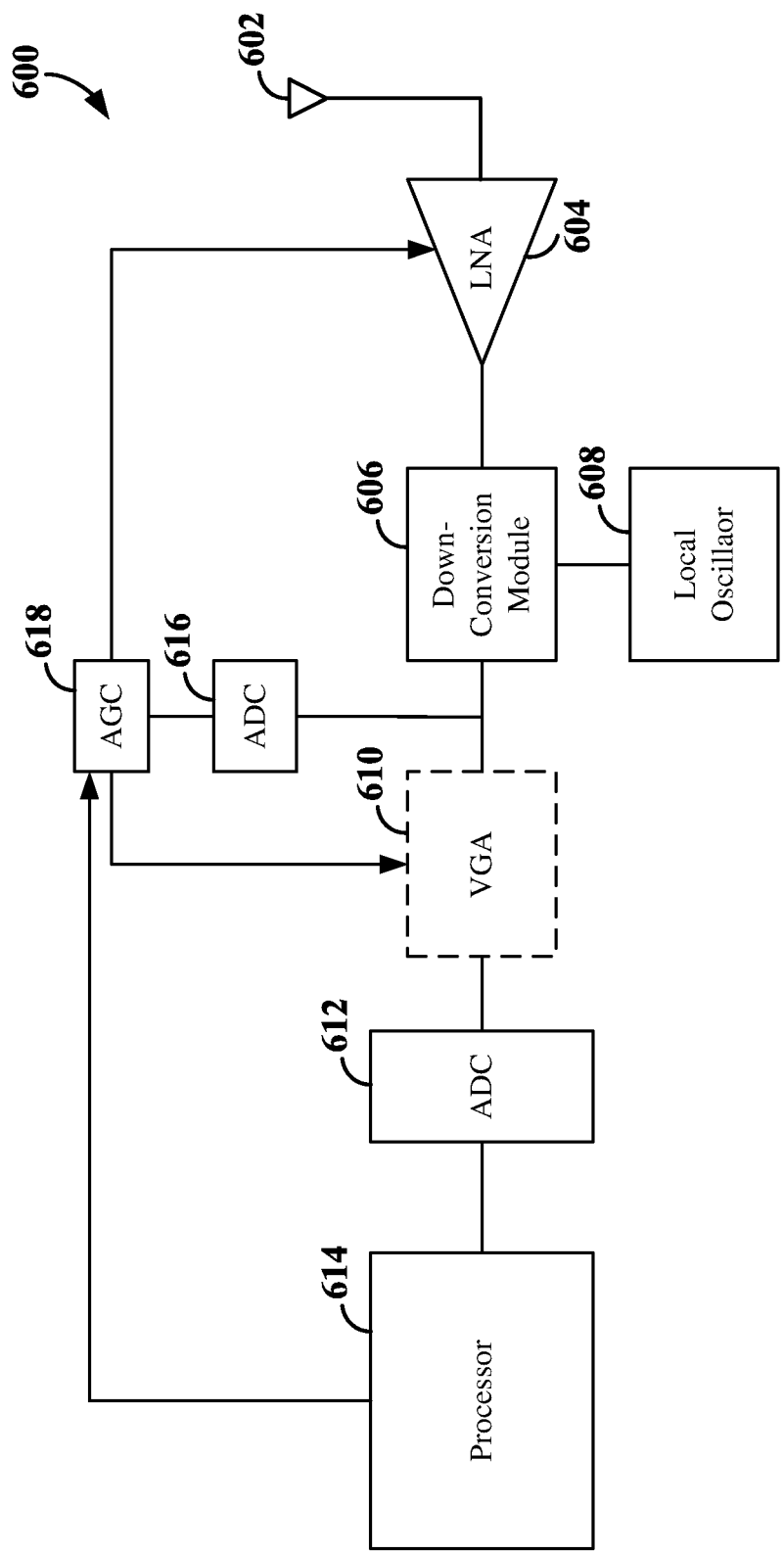
FIG. 6 is a block diagram illustrating exemplary components of a UE according to some aspects.

FIG. 6 illustrates an example of a UE 600 configured to modify an AGC state of one or more receiver gain stages within the UE. The UE 600 includes an antenna 602, a low noise amplifier (LNA) 604, a down-conversion module 606, a local oscillator 608, an optional variable gain amplifier 610, an analog-to-digital converter (ADC) 612, and a processor 614. The antenna 602 may be a single antenna that is shared by transmit and receive paths (half-duplex) or may include separate antennas for the transmit path and receive path (full-duplex). The antenna may further include multiple transmit and/or receive antennas to support MIMO and/or beamforming technology.

The LNA 604 is configured to receive a radio frequency (RF) signal from the antenna 602 and to amplify the RF signal to produce an amplified RF signal. The down-conversion module 606 is configured to receive the amplified RF signal from the LNA 604 and to convert the amplified RF signal into a low intermediate frequency (IF) signal or baseband signal based on a local oscillation provided by the local oscillator 608. The optional VGA 610 is configured to receive the low IF or baseband signal from the down-conversion module and to adjust the gain of the low IF or baseband signal before providing the low IF or baseband signal to the ADC 612. The ADC 612 converts the low IF or baseband signal from the analog domain to the digital domain to produce a digital signal that may be processed by the processor 614. For example, the processor 614 may demodulate, demap, descramble, and/or decode the digital signal to produce information (e.g., control information and/or user data traffic).

The UE 600 further includes an additional ADC 616 and an automatic gain control (AGC) module 618. The additional ADC 616 is configured to receive the low IF signal or baseband signal from the down-conversion module and to convert the low IF signal or baseband signal from the analog domain to the digital domain to produce an additional digital signal for input to the AGC module 618. The AGC module 618 is configured to continuously monitor the received power (or received signal strength) of the additional digital signal and adjust one or more receiver gain stages of the UE based on the received power (or received signal strength) to ensure the received signal strength at the input to the ADC 612 is sufficient for proper decoding. The one or more gain stages may include, for example, the LNA 604 and the VGA 610.

For example, if the received strength is low, the AGC module 618 may boost the one or more receiver gain stages. Doing so can minimize noise and bring the signal level to an acceptable signal-to-noise ratio (SNR) at the input to the ADC 612 (e.g., within the dynamic range of the ADC 612). As another example, if the received signal strength is high, the AGC module 618 may attenuate the one or more receiver gain stages to avoid signal clipping and nonlinear degradation and bring the signal level to an acceptable SNR at the input to the ADC 612. In general, the AGC module 618 may be configured to increase or decrease the gain of the one or more gain stages by a specific step size based on a comparison between the received signal strength and one or more thresholds, each of which may be associated with a different gain step size. For example, the gain step sizes per threshold may be defined in a look-up table (not shown).

In various aspects of the disclosure, the processor 614 may further be configured to instruct the AGC module 618 to modify the AGC state of one or more of the receiver gain stages (e.g., LNA 604 and/or VGA 610). Modification can be based on a difference in the RSRP of a current downlink beam currently utilized by a base station for communication with the UE 600 and an expected downlink beam expected to be utilized by the base station for a subsequent downlink transmission to the UE 600. In some examples, the processor 614 may instruct the AGC module 618 to modify the AGC state by an amount equal to the difference between the RSRP of the current beam and the RSRP of the expected beam.

In an example, the processor 614 can carry out and/or implement a number of specialized actions or functions. For example, the processor 614 may be configured to receive a respective reference signal on each of a plurality of downlink beams Receipt of reference signals may be during a beam sweep performed by the base station (e.g., via the antenna 602, LNA 604, down-conversion module 606, VGA 610, and ADC 612). As another example, the processor 614 may measure the RSRP of the respective reference signal corresponding to each of the plurality of downlink beams. The processor 614 may further be configured to compare the measured RSRP of each the downlink beams to identify the expected downlink beam expected to be utilized by the base station for the subsequent downlink transmission. In some examples, the expected downlink beam has the highest measured RSRP among all of the measured RSRPs of the downlink beams. The processor 614 may further identify the measured RSRP of the current downlink beam and calculate the difference between the measured RSRP of the current downlink beam and the measured RSRP of the expected downlink beam. Based on the RSRP difference, the processor 614 may then instruct the AGC module 618 to modify the AGC state by an amount corresponding to the RSRP difference.

Figure 7:
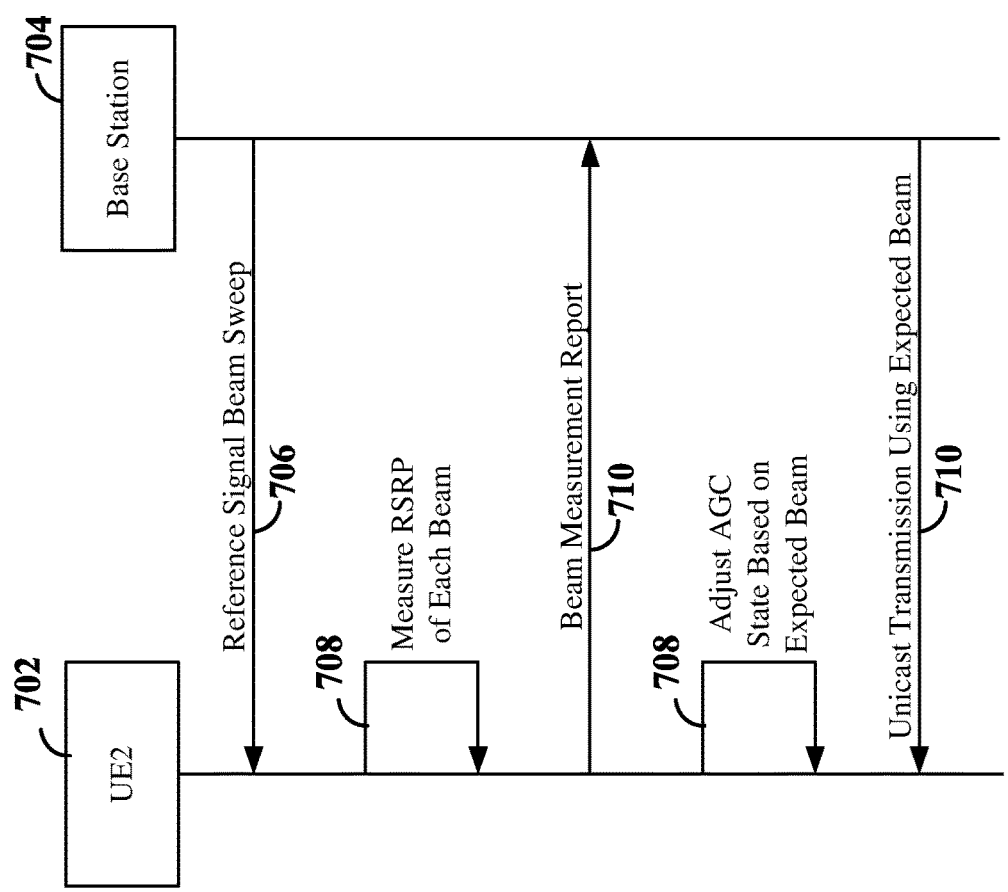
FIG. 7 is a signaling diagram illustrating exemplary signaling for minimizing the BLER based on an expected beam switch according to some aspects.

FIG. 7 illustrates exemplary signaling between a UE 702 and a base station 704 to minimize the BLER based on an expected beam switch. The UE 702 may correspond to any of the UEs shown in FIGS. 1, 2, 5, and/or 6. In addition, the base station 704 may correspond to any of the base stations shown in FIGS. 1, 2, 5, and/or 6.

At 706, the base station 704 may perform a beam sweep to transmit a reference signal (e.g., an SSB or CSI-RS) on each of a plurality of downlink beams to the UE 702. At 708, the UE 702 may measure the RSRP on each of the plurality of downlink beams. At 710, the UE 702 may generate and transmit a beam measurement report including the measured RSRP of each of the plurality of downlink beams.

Based on the measured RSRP of each of the plurality of downlink beams, at 712, the UE 702 may further adjust the AGC state of the UE based on an expected beam of the plurality of beams expected to be selected by the base station 704 for a subsequent unicast downlink transmission to the UE 702. For example, the UE 702 may adjust the AGC state of one or more receiver gain stages (e.g., the LNA and/or VGA in the receiver chain). In some examples, the UE 702 may modify the AGC state by an amount equal to the difference between the RSRP of a current downlink beam and the RSRP of the expected downlink beam. For example, when the UE 702 anticipates the base station 704 switching from a current wide beam to an expected narrow beam, the UE 702 may attenuate the one or more receiver gain stages as a result of the expected increase in RSRP between the current wide beam and the expected narrow beam.

At 714, the UE 702 may receive a unicast downlink transmission via the expected downlink beam from the base station 704. By modifying the AGC state prior to receipt of the unicast downlink transmission, the UE 702 may minimize the BLER of the unicast downlink transmission.

Figure 8:
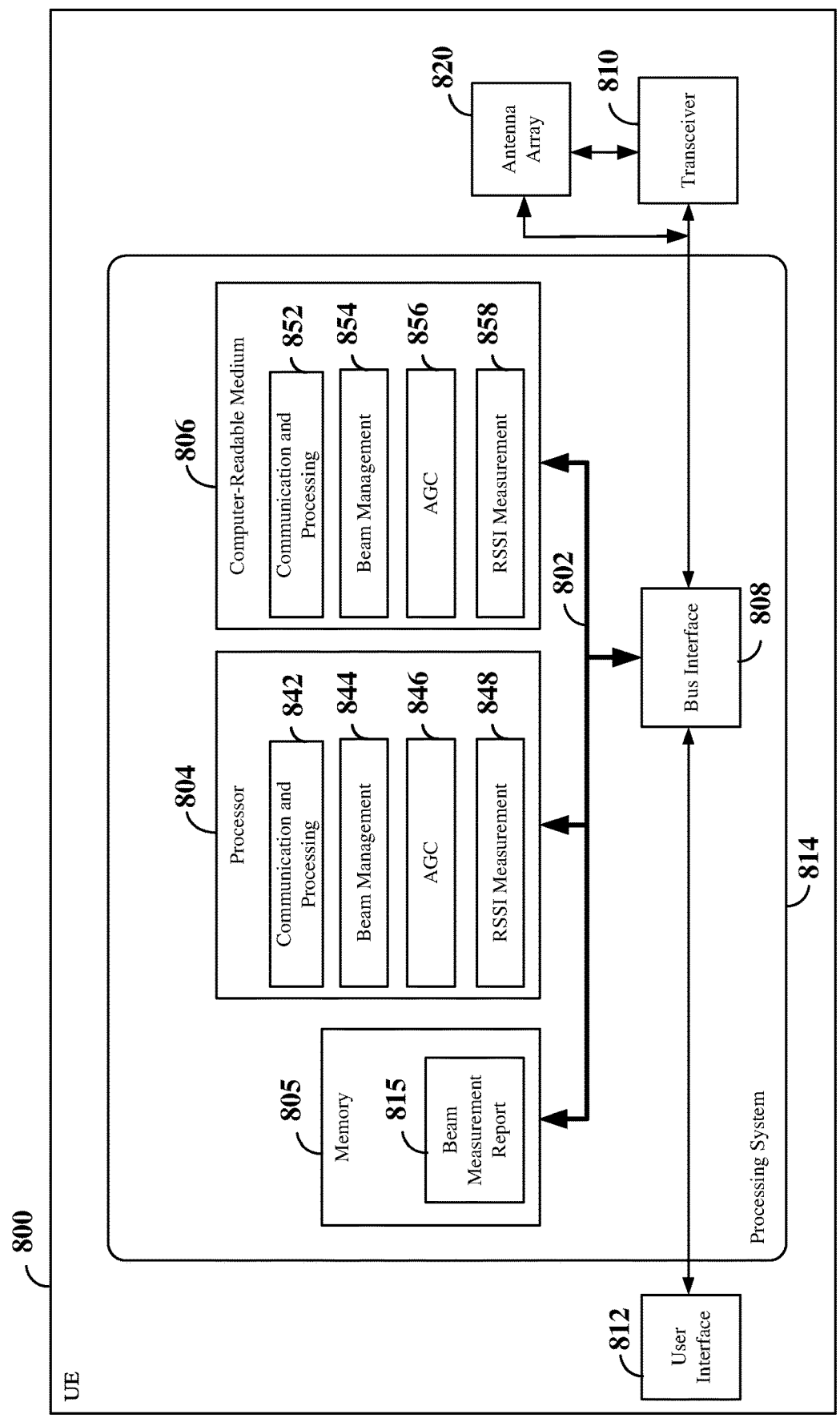
FIG. 8 is a block diagram illustrating an example of a hardware implementation for a UE employing a processing system according to some aspects.

FIG. 8 is a conceptual diagram illustrating an example of a hardware implementation for an exemplary user equipment (UE) employing a processing system 814. For example, the UE 800 may be a UE as illustrated in any one or more of FIGS. 1, 2, and/or 5-7.

The UE 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 800 may be configured to perform any one or more of the functions described herein. That is, the processor 804, as utilized in a UE 800, may be used to implement any one or more of the processes described below. The processor 804 may in some instances be implemented via a baseband or modem chip and in other implementations, the processor 804 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a means for communicating with various other apparatus over a transmission medium (e.g., air interface). A user interface 812 (e.g., keypad, display, speaker, microphone, joystick) may also be provided.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. In some examples, the computer-readable medium 806 may be part of the memory 805. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 804 may include circuitry configured for various functions. For example, the processor 804 may include communication and processing circuitry 842, configured to communicate with a base station. In some examples, the communication and processing circuitry 842 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 842 may be configured to generate and transmit an uplink beamformed signal at a mmWave frequency or a sub-6 GHz frequency via the transceiver 810 and antenna array 820. For example, the communication and processing circuitry 842 may be configured to transmit a beam measurement report 815 to the base station. In addition, the communication and processing circuitry 842 may be configured to receive and process a downlink beamformed signal at a mmWave frequency or a sub-6 GHz frequency via the antenna array module 820 and the transceiver 810. For example, the communication and processing circuitry 842 may be configured to receive a respective reference signal on each of a plurality of downlink beams from the base station during a beam sweep. The communication and processing circuitry 842 may further be configured to receive unicast downlink control information and/or user data traffic from the base station on a selected downlink beam.

The communication and processing circuitry 842 may further be configured to receive a CSI-RS from the base station on a current downlink beam and to transmit channel state feedback (CSF) to the base station in response to the CSI-RS. The CSF may include, for example, a channel quality indicator (CQI), precoding matrix indicator (PMI) and rank indicator (RI). In addition, the communication and processing circuitry 842 may be configured to implement a HARQ-based feedback mechanism to transmit ACK/NACK to the base station. The communication and processing circuitry 842 may further be configured to execute communication and processing software 852 stored in the computer-readable medium 806 to implement one or more of the functions described herein.

The processor 804 may further include beam management circuitry 844, configured to measure a respective RSRP on each of the plurality of downlink beams during the downlink beam sweep by the base station and to generate the beam measurement report 815 for transmission to the base station including the measured RSRP of each of the plurality of downlink beams. The beam measurement report 815 may further be stored within the memory 805 for further processing. In addition, the beam management circuitry 844 may be configured to identify an expected downlink beam expected to be utilized by the base station for a subsequent downlink transmission based on the respective RSRP measured for each of the plurality of downlink beams. In some examples, the expected downlink beam corresponds to the downlink beam having the highest measured RSRP.

The beam management circuitry 844 may further be configured to generate and transmit a variety of signals. The generation and transmission may be done in conjunction with the communication and processing circuitry 842. The reference signals can include an uplink reference signal on each of a plurality of uplink beams in different beam directions. Each uplink reference signal may include, for example, a contention-based RACH (Random Access Channel) message or a Sounding Reference Signal (SRS). Transmission of a contention-based RACH message may occur during initial access and/or failure recovery utilizing RACH resources covering all directions that are periodically allocated by the base station and shared by all UEs in the cell. Transmission of a SRS may occur during connected mode and may be aperiodically triggered by the base station, periodically scheduled by the base station, or semi-persistently scheduled by the base station. The base station may perform received beam quality measurements on the uplink beam reference signals to identify the uplink beam on which the UE should transmit control information and/or user data traffic to the base station. Examples of beam quality measurements may include, but are not limited to, the received power or the signal-to-noise ratio (SNR). In some examples, the beam management circuitry 844, together with the communication and processing circuitry 842, may receive an uplink beam selection signal indicating the selected serving uplink beam from the base station. The beam management circuitry 844 may further be configured to execute beam management software 854 stored in the computer-readable medium 806 to implement one or more of the functions described herein.

The processor 804 may further include antenna gain control (AGC) circuitry 846 and received signal strength indicator (RSSI) measurement circuitry 848. The AGC circuitry 846 may be configured to modify an AGC state of the UE 800 based on the expected downlink beam identified by the beam management circuitry 844. For example, the AGC circuitry 846 may be configured to determine a first RSRP of the current downlink beam measured by the beam management circuitry 844 and a second RSRP of the expected downlink beam measured by the beam management circuitry 844. The AGC circuitry 846 may further be configured to modify the AGC state of the UE 800 by an amount equal to the difference between the first RSRP and the second RSRP. In some examples, the AGC circuitry 846 may be configured to attenuate one or more receiver gain stages (e.g., within the transceiver 810) by the amount equal to the difference between the first and second RSRPs. In some examples, the AGC circuitry 846 may correspond to the AGC module 618 and processor 614 shown in FIG. 6 and may be configured to modify the AGC state of a LNA and/or VGA, as described above in connection with FIG. 6.

The AGC circuitry 846 may further be configured to adjust the AGC state over a period of time to converge back to an initial AGC state (e.g., the nominal value associated with the current downlink beam prior to modifying the AGC state for the expected downlink beam) when the expected downlink beam is not selected by the base station for subsequent unicast downlink transmissions to the UE 800. For example, the AGC circuitry 846 may apply a slow attenuation to the AGC state to substantially preserve the AGC state during the transition by the base station from the current downlink beam to the expected downlink beam. In some examples, the expected transition time interval for transitioning from the current downlink beam to the expected downlink beam may include several slots. The AGC circuitry 846 may further apply slow attenuation to the AGC state over an additional time interval extending beyond the expected transition time interval to converge the AGC state back to the initial AGC state. Thus, the period of time over which the AGC circuitry 846 may adjust (e.g., slowly attenuate) the AGC state may include both the transition time interval and the additional time interval. The AGC circuitry 846 may further be configured to execute AGC software 856 stored in the computer-readable medium 806 to implement one or more of the functions described herein.

The RSSI measurement circuitry 848 may be configured to measure a respective RSSI of each of a plurality of received signals received from the base station over the period of time. The RSSI measurement circuitry 848 may further be configured to provide the measured RSSI over the period of time to the AGC circuitry 846. The AGC circuitry 846 may adjust (e.g., slowly attenuate) the AGC state when the measured RSSI substantially corresponds to the first RSRP of the current downlink beam (or similarly, the measured RSSI does not substantially correspond to the second RSRP of the expected downlink beam), thus indicating that the base station has not yet switched to the expected downlink beam. The RSSI measurement circuitry 848 may further be configured to execute RSSI measurement software 858 stored in the computer-readable medium 806 to implement one or more of the functions described herein.

Figure 9:
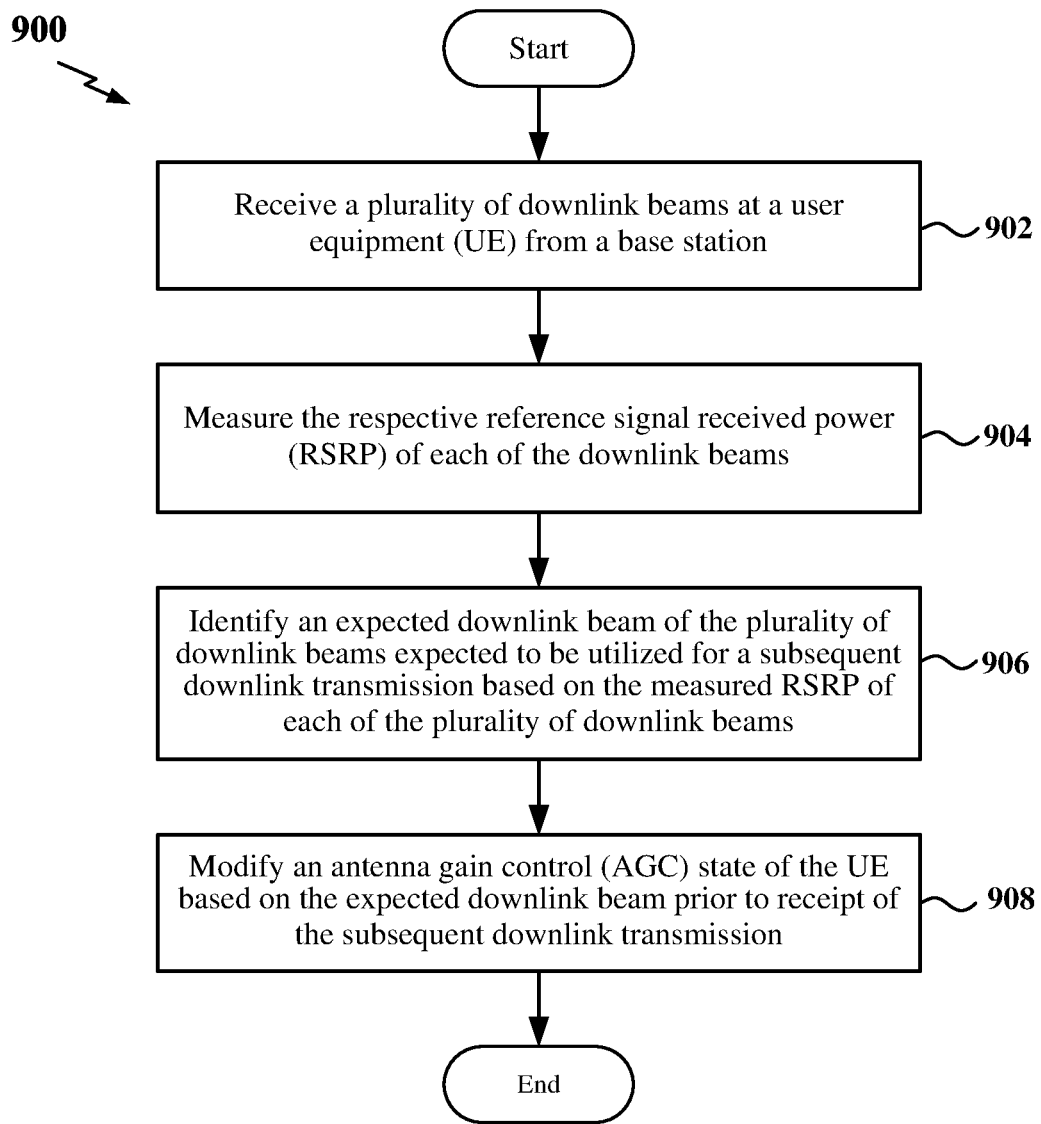
FIG. 9 is a flow chart of an exemplary method for a UE to minimize BLER associated with an expected beam switch according to some aspects.

FIG. 9 is a flow chart 900 of a method for a UE to minimize BLER associated with a beam switch. As described below, some or all illustrated features may be omitted in a particular implementation within the scope of the present disclosure, and some illustrated features may not be required for implementation of all embodiments. In some examples, the method may be performed by the UE 800, as described above and illustrated in FIG. 8, by a processor or processing system, or by any suitable means for carrying out the described functions.

At block 902, the UE may receive a plurality of downlink beams from a base station. For example, the base station may transmit a reference signal on each of the plurality of downlink beams during a beam sweep to the UE. For example, the communication and processing circuitry 842 shown and described above in connection with FIG. 8 may receive the plurality of downlink beams.

At block 904, the UE may measure the respective RSRP of each of the plurality of downlink beams. For example, the beam management circuitry 844 shown and described above in connection with FIG. 8 may measure the RSRP of each of the downlink beams.

At block 906, the UE may identify an expected downlink beam of the plurality of downlink beams expected to be utilized by the base station for a subsequent downlink transmission based on the measured RSRP of each of the plurality of downlink beams. In some examples, the expected downlink beam has the highest measured RSRP among all of the downlink beams. For example, the beam management circuitry 844 shown and described above in connection with FIG. 8 may identify the expected downlink beam.

At block 908, the UE may modify an AGC state of the UE based on the expected downlink beam prior to receipt of the subsequent downlink transmission. In some examples, the UE may determine a first RSRP of the current downlink beam currently utilized by the base station for downlink transmissions and a second RSRP of the expected downlink beam expected to be utilized by the base station for future downlink transmissions. The UE may then modify the AGC state by an amount equal to the difference between the first RSRP and the second RSRP. In some examples, the UE may be configured to attenuate one or more receiver gain stages by the amount equal to the difference between the first and second RSRPs. For example, the AGC circuitry 846 shown and described above in connection with FIG. 8 may modify the AGC state of the UE.

Figure 10:
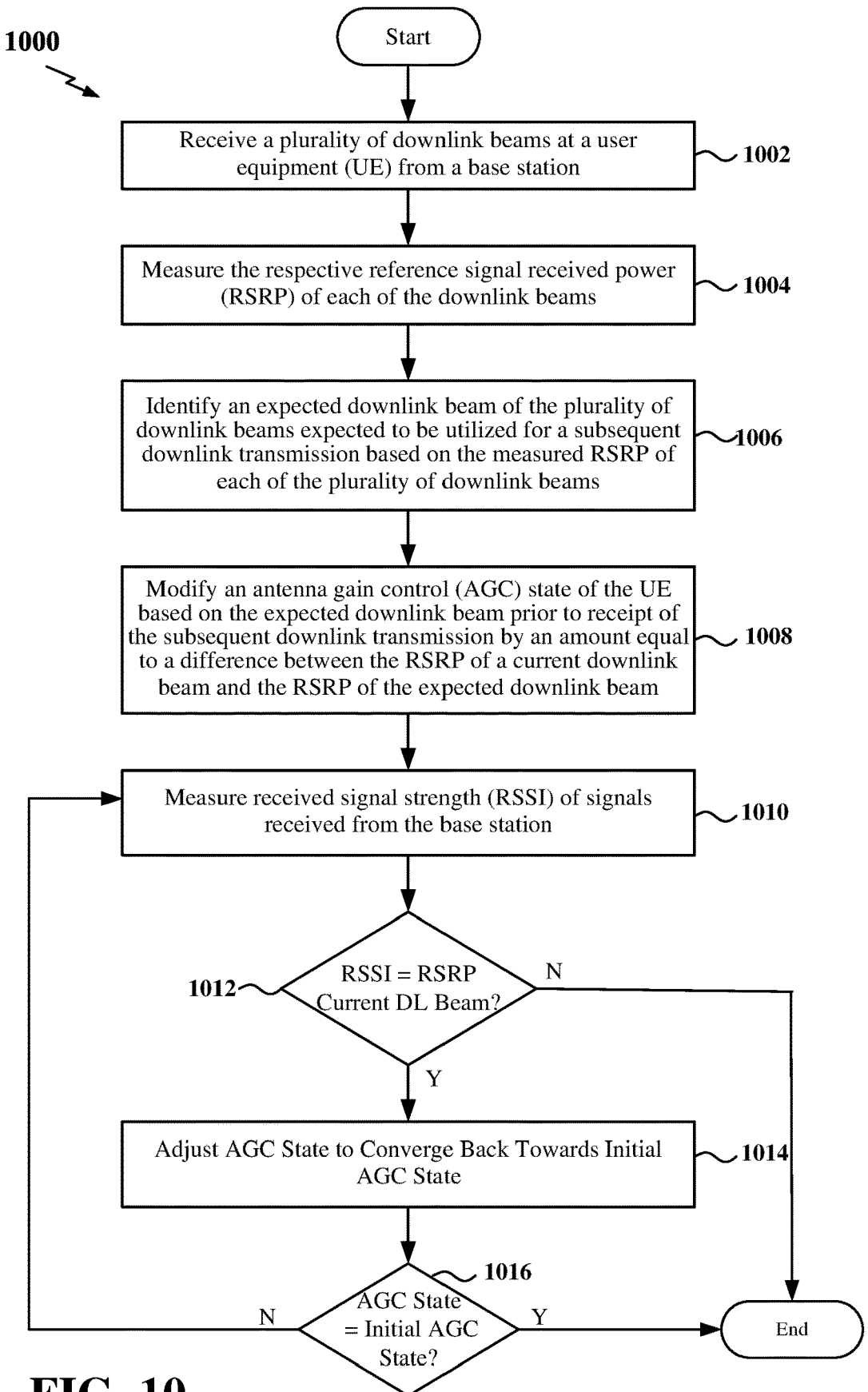
FIG. 10 is a flow chart of another exemplary method for a UE to minimize BLER associated with an expected beam switch according to some aspects.

FIG. 10 is a flow chart 1900 of a method for a UE to minimize BLER associated with a beam switch. As described below, some or all illustrated features may be omitted in a particular implementation within the scope of the present disclosure, and some illustrated features may not be required for implementation of all embodiments. In some examples, the method may be performed by the UE 800, as described above and illustrated in FIG. 8, by a processor or processing system, or by any suitable means for carrying out the described functions.

At block 1002, the UE may receive a plurality of downlink beams from a base station. For example, the base station may transmit a reference signal on each of the plurality of downlink beams during a beam sweep to the UE. For example, the communication and processing circuitry 842 shown and described above in connection with FIG. 8 may receive the plurality of downlink beams.

At block 1004, the UE may measure the respective RSRP of each of the plurality of downlink beams. For example, the beam management circuitry 844 shown and described above in connection with FIG. 8 may measure the RSRP of each of the downlink beams.

At block 1006, the UE may identify an expected downlink beam of the plurality of downlink beams expected to be utilized by the base station for a subsequent downlink transmission based on the measured RSRP of each of the plurality of downlink beams. In some examples, the expected downlink beam has the highest measured RSRP among all of the downlink beams. For example, the beam management circuitry 844 shown and described above in connection with FIG. 8 may identify the expected downlink beam.

At block 1008, the UE may modify an AGC state of the UE based on the expected downlink beam prior to receipt of the subsequent downlink transmission. In some examples, the UE may determine a first RSRP of the current downlink beam currently utilized by the base station for downlink transmissions and a second RSRP of the expected downlink beam expected to be utilized by the base station for future downlink transmissions. The UE may then modify the AGC state by an amount equal to the difference between the first RSRP and the second RSRP. In some examples, the UE may be configured to attenuate one or more receiver gain stages by the amount equal to the difference between the first and second RSRPs. For example, the AGC circuitry 846 shown and described above in connection with FIG. 8 may modify the AGC state of the UE.

At block 1010, the UE may measure the received signal strength (e.g., the RSSI) of signals received from the base station. For example, the RSSI measurement circuitry 848 shown and described above in connection with FIG. 8 may measure the RSSI of received signals.

At block 1012, the UE may determine whether the measured RSSI is equal to the RSRP of the current downlink beam (e.g., as determined at block 1004). If the measured RSSI is equal to the RSRP of the current downlink beam, at block 1014, the UE may adjust the AGC state to converge back towards an initial AGC state (e.g., the nominal value prior to modifying the AGC state for the expected downlink beam). In some examples, the UE may apply a slow attenuation to the AGC state to substantially preserve the modified AGC state during an expected transition time interval for transitioning from the current downlink beam to the expected downlink beam. For example, the AGC circuitry 846 shown and described above in connection with FIG. 8 may compare the measured RSSI to the measured RSRP for the current downlink beam and adjust the AGC state when the RSSI is equal to the RSRP for the current downlink beam.

At block 1016, the UE may determine whether the AGC state has converged back to the initial AGC state. If the AGC state differs from the initial AGC state, the process may return to block 1010, where the UE may measure the RSSI of received signals and further adjust the AGC state at blocks 1012 and 1014. For example, the AGC circuitry 846 shown and described above in connection with FIG. 8 may determine whether the AGC has converged back to the initial AGC state.

Figure 11:
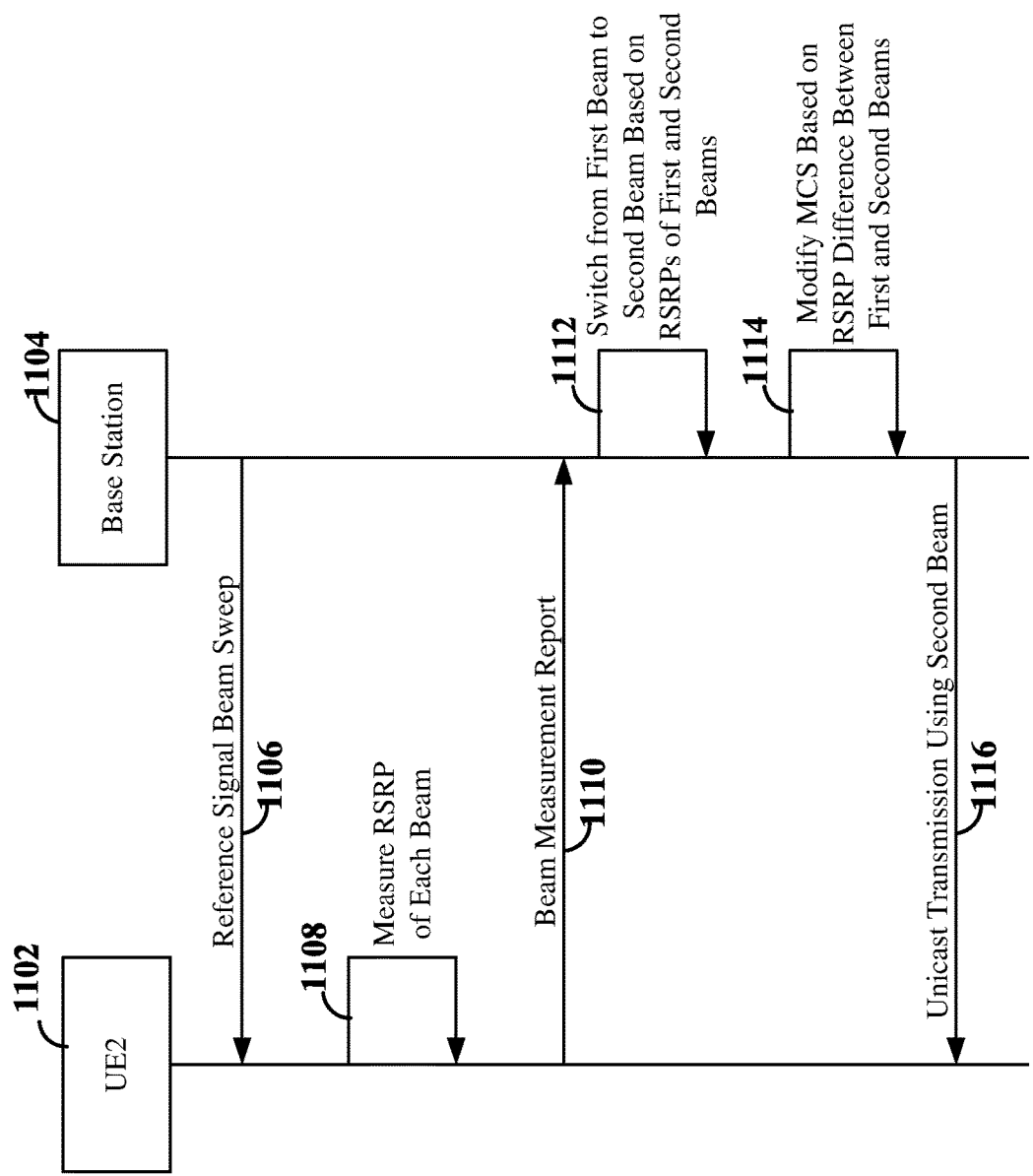
FIG. 11 illustrates exemplary signaling between a UE and a base station to minimize the BLER based on a beam switch according to some aspects.

FIG. 11 illustrates exemplary signaling between a UE 1102 and a base station 1104 to minimize the BLER based on a beam switch. The UE 1102 may correspond to any of the UEs shown in FIGS. 1, 2, and/or 5-8. In addition, the base station 1104 may correspond to any of the base stations shown in FIGS. 1, 2, and/or 5-7.

At 1106, the base station 1104 may perform a beam sweep to transmit a reference signal (e.g., an SSB or CSI-RS) on each of a plurality of downlink beams to the UE 1102. At 1108, the UE 1102 may measure the RSRP on each of the plurality of downlink beams. At 1110, the UE 1102 may generate and transmit a beam measurement report including the measured RSRP of each of the plurality of downlink beams to the base station 1104.

At 1112, the base station 1104 may switch beams. An example switch can include switching from a first beam of the plurality of beams currently utilized for unicast downlink transmissions to the UE 1102 to a second beam of the plurality of beams for subsequent (future) unicast downlink transmissions to the UE 1102 based on the measured RSRPs of the first and second beams. For example, the second beam may have a higher RSRP than the first beam. In some examples, the second beam may have the highest RSRP among all of the beams.

At 1114, the base station 1104 may modify the modulation and coding scheme (MCS) based on the RSRP difference between the first and second beams. More particularly, the base station 1104 may modify the MCS for the second beam based on the current MCS utilized for the first beam and the RSRP difference between the first and second beams Generally, higher-order modulations (e.g., 64 QAM) may be utilized on beams with a higher RSRP. In addition, for a given modulation scheme, an appropriate code rate may be selected based on the channel (beam) quality. For example, a higher code rate may be utilized on beams with better quality (e.g., a higher RSRP). At 1116, the base station 1104 may generate a unicast downlink transmission towards the UE 1102 using the second beam and the modified (new) MCS.

Figure 12:
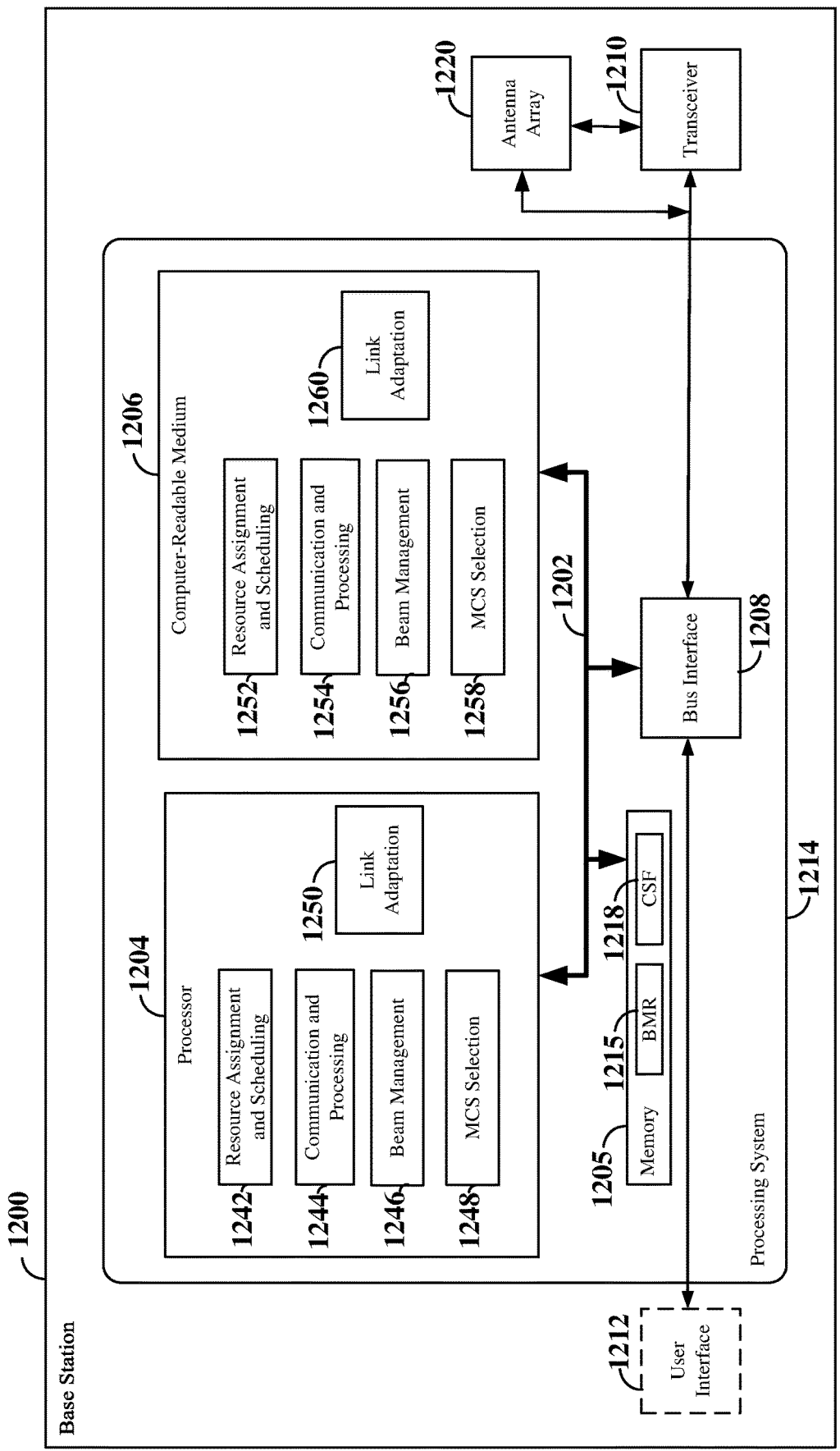
FIG. 12 is a block diagram illustrating an example of a hardware implementation for a base station employing a processing system according to some aspects.

FIG. 12 is a conceptual diagram illustrating an example of a hardware implementation for an exemplary base station 1200 employing a processing system 1214. For example, the base station 1200 may be a base station as illustrated in any one or more of FIGS. 1, 2, 5-7 and/or 11.

The processing system 1214 may be substantially the same as the processing system 814 illustrated in FIG. 8. The system 1214 can include a bus interface 1208, a bus 1202, memory 1205, a processor 1204, and a computer-readable medium 1206. Furthermore, the base station 1200 may include an optional user interface 1212 and a transceiver 1210 substantially similar to those described above in FIG. 8. In addition, the UE may further include one or more antenna array modules 1220. In accordance with various aspects of the disclosure, an element, or any portion of an element, or any combination of elements may be implemented with the processing system 1214 that includes one or more processors 1204. That is, the processor 1204, as utilized in a base station 1200, may be used to implement any one or more of the processes described below.

In some aspects of the disclosure, the processor 1204 may include circuitry configured for various functions. For example, the processor 1204 may include resource assignment and scheduling circuitry 1242, configured to generate, schedule, and modify a resource assignment or grant of time-frequency resources (e.g., a set of one or more resource elements). For example, the resource assignment and scheduling circuitry 1242 may schedule time-frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 1242 may be configured to allocate/schedule downlink resources (e.g., mmWave or sub-6 GHz resources) for the transmission of downlink beam reference signals during a downlink beam sweep to a UE. The resource assignment and scheduling circuitry 1242 may further be configured to allocate/schedule uplink resources for the transmission of a beam measurement report from the UE to the base station 1200. In other examples, the resource assignment and scheduling circuitry 1242 may be configured to allocate/schedule uplink resources for the transmission of uplink beam reference signals from the UE to the base station 1200 during an uplink beam sweep. The resource assignment and scheduling circuitry 1242 may further be configured to execute resource assignment and scheduling software 1252 stored in the computer-readable medium 1206 to implement one or more of the functions described herein.

The processor 1204 may further include communication and processing circuitry 1244 configured to communicate with a UE. In some examples, the communication and processing circuitry 1244 may include one or more hardware components that provide the physical structure that performs processes related to wireless communication (e.g., signal reception and/or signal transmission) and signal processing (e.g., processing a received signal and/or processing a signal for transmission). In some examples, the communication and processing circuitry 1244 may be configured to generate and transmit a downlink signal at a mmWave frequency or a sub-6 GHz frequency via the transceiver 1210 and antenna array module(s) 1220. In addition, the communication and processing circuitry 1244 may be configured to receive and process an uplink signal at a mmWave frequency or a sub-6 GHz frequency via the antenna array module(s) 1220 and the transceiver 1210.

For example, the communication and processing circuitry 1244 may be configured to generate and transmit a respective reference signal (e.g., an SSB or CSI-RS) on each of a plurality of downlink beams to the UE during a beam sweep. In addition, the communication and processing circuitry 1244 may be configured to receive a beam measurement report from the UE including the measured RSRP on each of the plurality of downlink beams. The communication and processing circuitry 1244 may further be configured to receive a respective uplink reference signal (e.g., a RACH message or SRS) on each of a plurality of uplink beams from the UE.

The communication and processing circuitry 1244 may further be configured to transmit a CSI-RS to the UE and receive channel state feedback (CSF) 1218 from the UE in response to the CSI-RS. The CSF may include, for example, a channel quality indicator (CQI), precoding matrix indicator (PMI) and rank indicator (RI). In some examples, the communication and processing circuitry 1244 may store the CSF 1218 in memory 1205 for further processing. In addition, the communication and processing circuitry 1244 may be configured to implement a HARQ feedback mechanism to receive ACK/NACK from the UE. The communication and processing circuitry 1244 may further be configured to execute communication and processing software 1254 stored on the computer-readable medium 1206 to implement one or more functions described herein.

The processor 1204 may further include beam management circuitry 1246, configured to communicate with a UE (e.g., in conjunction with the communication and processing circuitry 1244). Communication may utilize a first downlink beam of the plurality of downlink beams. The beam management circuitry 1246 may further be configured to process a beam measurement report 1215 received from the UE (e.g., via the communication and processing circuitry 1244). The beam measurement report (BMR) 1215 may include the measured RSRP of each of the plurality of downlink beams. In addition, the BMR 1215 may further be stored within the memory 1205 for further processing. The beam management circuitry 1246 may be configured to switch from the first downlink beam to a second downlink beam of the plurality of downlink beams for communication with the UE based on the respective RSRP measured for each of the plurality of downlink beams. For example, the second downlink beam may have a higher RSRP than the first downlink beam. In some examples, the second downlink beam corresponds to the downlink beam having the highest measured RSRP. The beam management circuitry 1246 may further be configured to calculate a difference between a first measured RSRP associated with the first downlink beam and a second measured RSRP associated with the second downlink beam from the beam measurement report 1215.

The beam management circuitry 1246 may further be configured to receive (e.g., in conjunction with the communication and processing circuitry 1244) a respective uplink reference signal on each of a plurality of uplink beams from the UE. The beam management circuitry 1246 may further be configured to perform signal quality measurements on the uplink beam reference signals to identify the uplink beam on which the UE should transmit control information and/or user data traffic to the base station 1200. Examples of signal quality measurements may include, but are not limited to, the received power or the signal-to-noise ratio (SNR). In examples in which the channel is reciprocal, the beam management circuitry 1246, may switch from the first downlink beam to the second downlink beam based on the signal quality measurements of corresponding uplink beams. In this example, the beam management circuitry 1246 may estimate the difference between the first RSRP of the first downlink beam and the second RSRP of the second downlink beam based on the respective signal quality measurements of a first uplink beam corresponding to the first downlink beam and a second uplink beam corresponding to the second downlink beam. The beam management circuitry 1246 may further be configured to execute beam management software 1256 stored in the computer-readable medium 1206 to implement one or more of the functions described herein.

The processor 1204 may further include MCS selection circuitry 1248, configured to select an MCS for unicast downlink transmissions to the UE. In some examples, the MCS selection circuitry 1248 may select an MCS for downlink transmissions to the UE utilizing the first beam and then modify the MCS for downlink transmissions to the UE utilizing the second beam based on the difference between the first RSRP (associated with the first beam) and the second RSRP (associated with the second beam) determined by the beam management circuitry 1246. The MCS selection circuitry 1248 may modify the MCS utilized for downlink transmissions to the UE on the second beam prior to transmitting unicast downlink control information and/or user data traffic to the UE on the second beam. In some examples, a different MCS may be utilized for control information and user data traffic. The MCS selection circuitry 1248 may further be configured to execute MCS selection software 1258 stored in the computer-readable medium 1206 to implement one or more of the functions described herein.

The processor 1204 may further include link adaptation circuitry 1250, configured to further adjust the MCS after selecting the MCS for the second beam based on the RSRP difference between the first and second beams. In some examples, the link adaptation circuitry 1250 may utilize an outer-loop link adaptation process to adjust the MCS. For example, the link adaptation circuitry 1250 may be configured to adjust the MCS based on acknowledgement information (e.g., ACKs and NACKs) received from the UE. In other examples, the link adaptation circuitry 1250 may utilize the CSF 1218 received from the UE in response to a CSI-RS transmitted by the base station 1200 on the second beam to adjust the MCS. For example, the link adaptation circuitry 1250 may adjust the MCS based on the CQI in the CSF 1218. Upon adjusting the MCS based on the CQI, the link adaptation circuitry 1250 may further utilize the outer-loop link adaptation process to further adjust the MCS, as needed, until another CSI-RS is transmitted to the UE on the second beam. The link adaptation circuitry 1250 may further be configured to execute link adaptation software 1260 stored in the computer-readable medium 1206 to implement one or more of the functions described herein.

Figure 13:
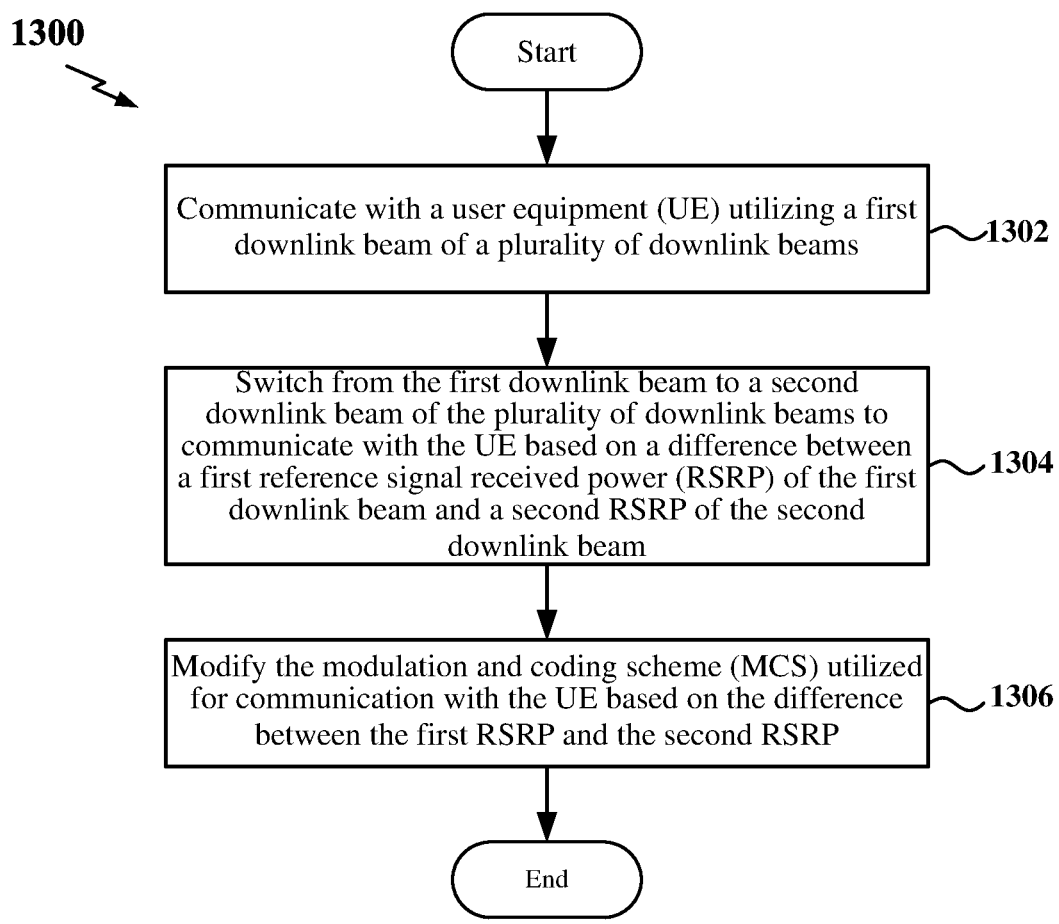
FIG. 13 is a flow chart of an exemplary method for a base station to minimize BLER associated with a beam switch according to some aspects.

FIG. 13 is a flow chart 1300 of a method for a base station to minimize BLER associated with a beam switch. As described below, some or all illustrated features may be omitted in a particular implementation within the scope of the present disclosure, and some illustrated features may not be required for implementation of all embodiments. In some examples, the method may be performed by the base station 1200, as described above and illustrated in FIG. 12, by a processor or processing system, or by any suitable means for carrying out the described functions.

At block 1302, the base station may communicate with a UE utilizing a first downlink beam of a plurality of downlink beams. The downlink beams may be, for example, mmWave or sub-6 GHz beams. For example, the communication and processing circuitry 1244 and beam management circuitry 1246 shown and described above in connection with FIG. 12 may communicate with the UE utilizing a first downlink beam.

At block 1304, the base station may switch from the first downlink beam to a second downlink beam of the plurality of downlink beams to communicate with the UE. In some examples, the base station may switch to the second downlink beam based on a difference between a first RSRP associated with the first downlink beam and a second RSRP associated with the second downlink beam. For example, the base station may calculate the RSRP difference based on a beam measurement report including the first RSRP associated with the first downlink beam and the second RSRP associated with the second downlink beam. As another example, the base station may estimate the RSRP difference between the first and second downlink beams based on uplink signal quality measurements of corresponding first and second uplink beams. For example, the beam management circuitry 1246 shown and described above in connection with FIG. 12 may determine the RSRP difference between the first and second downlink beams and switch to the second downlink beam based on the RSRP difference.

At block 1306, the base station may modify an MCS utilized for communication with the UE based on the difference between the first RSRP and the second RSRP. The modified MCS may be utilized for communication with the UE on the second beam immediately after switching from the first beam to the second beam (e.g., in the first slot after switching). For example, the MCS selection circuitry 1248 shown and described above in connection with FIG. 12 may modify the MCS.

Figure 14:
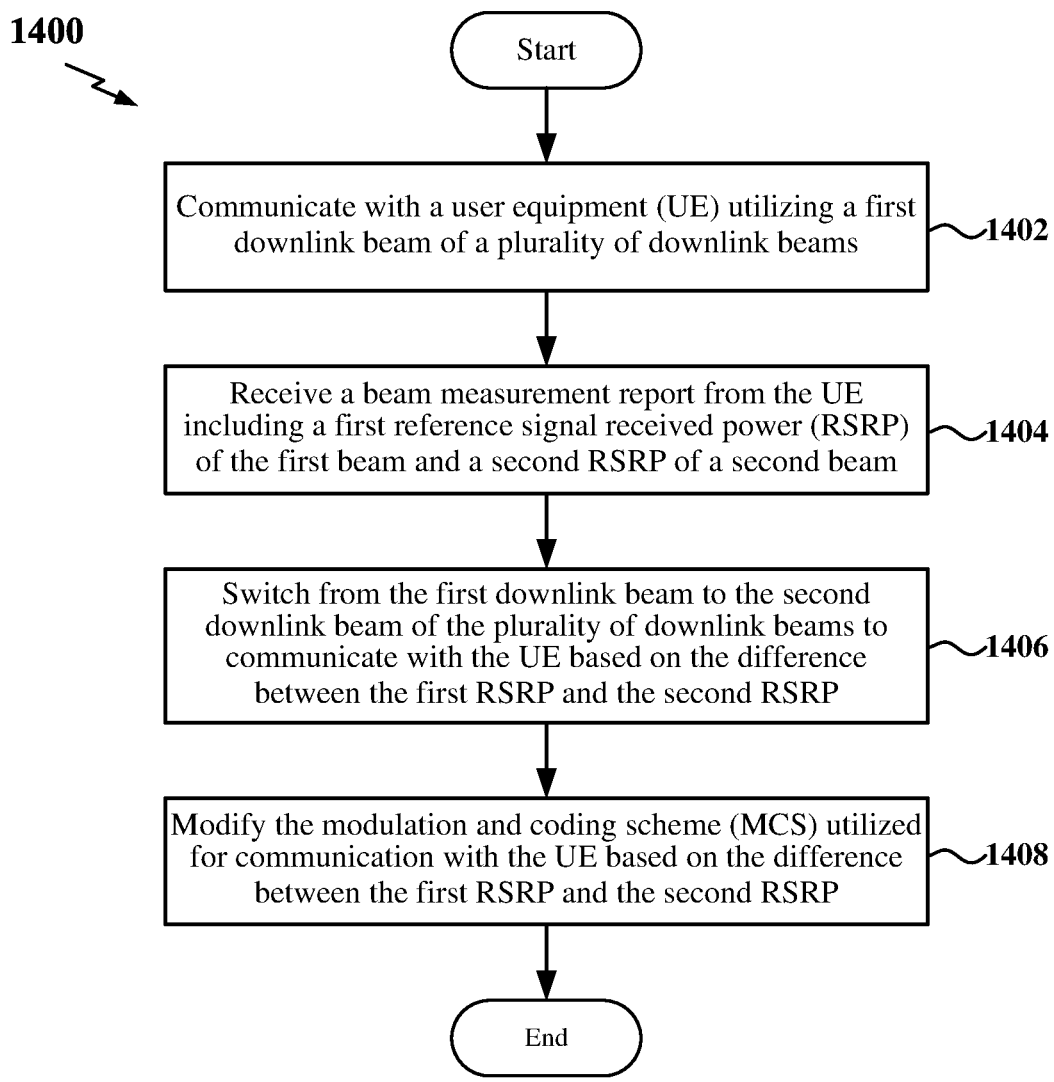
FIG. 14 is a flow chart of another exemplary method for a base station to minimize BLER associated with a beam switch according to some aspects.

FIG. 14 is a flow chart 1400 of a method for a base station to minimize BLER associated with a beam switch. As described below, some or all illustrated features may be omitted in a particular implementation within the scope of the present disclosure, and some illustrated features may not be required for implementation of all embodiments. In some examples, the method may be performed by the base station 1200, as described above and illustrated in FIG. 12, by a processor or processing system, or by any suitable means for carrying out the described functions.

At block 1402, the base station may communicate with a UE utilizing a first downlink beam of a plurality of downlink beams. The downlink beams may be, for example, mmWave or sub-6 GHz beams. For example, the communication and processing circuitry 1244 and beam management circuitry 1246 shown and described above in connection with FIG. 12 may communicate with the UE utilizing a first downlink beam.

At block 1404, the base station may receive a beam measurement report from the UE. The beam measurement report may include a respective RSRP measured on each of a plurality of downlink beams during a beam sweep performed by the base station. In particular, the beam measurement report may include a first RSRP of the first beam and a second RSRP of a second beam, where the second RSRP may be higher than the first RSRP. In some examples, the second RSRP may be a highest RSRP among all of the downlink beams. For example, the beam management circuitry 1246 and communication and processing circuitry 1244 shown and described above in connection with FIG. 12 may receive the beam measurement report.

At block 1406, the base station may switch from the first downlink beam to a second downlink beam of the plurality of downlink beams to communicate with the UE based on a difference between the first RSRP associated with the first downlink beam and the second RSRP associated with the second downlink beam. For example, the beam management circuitry 1246 shown and described above in connection with FIG. 12 may determine the RSRP difference between the first and second downlink beams and switch to the second downlink beam based on the RSRP difference.

At block 1408, the base station may modify an MCS utilized for communication with the UE based on the difference between the first RSRP and the second RSRP. The modified MCS may be utilized for communication with the UE on the second beam immediately after switching from the first beam to the second beam (e.g., in the first slot after switching). For example, the MCS selection circuitry 1248 shown and described above in connection with FIG. 12 may modify the MCS.

Figure 15:
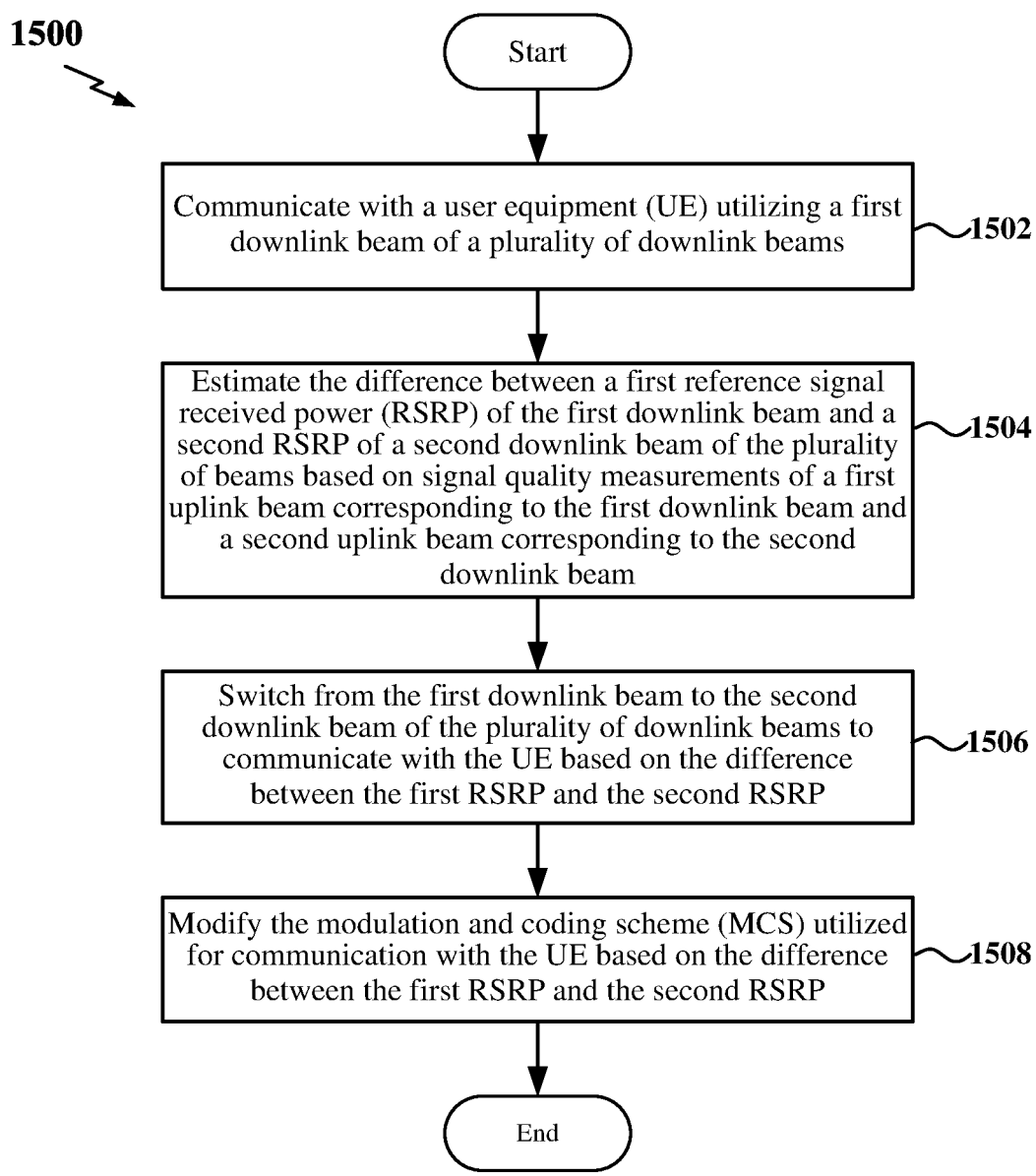
FIG. 15 is a flow chart of another exemplary method for a base station to minimize BLER associated with a beam switch according to some aspects.

FIG. 15 is a flow chart 1500 of a method for a base station to minimize BLER associated with a beam switch. As described below, some or all illustrated features may be omitted in a particular implementation within the scope of the present disclosure, and some illustrated features may not be required for implementation of all embodiments. In some examples, the method may be performed by the base station 1200, as described above and illustrated in FIG. 12, by a processor or processing system, or by any suitable means for carrying out the described functions.

At block 1502, the base station may communicate with a UE utilizing a first downlink beam of a plurality of downlink beams. The downlink beams may be, for example, mmWave or sub-6 GHz beams. For example, the communication and processing circuitry 1244 and beam management circuitry 1246 shown and described above in connection with FIG. 12 may communicate with the UE utilizing a first downlink beam.

At block 1504, when the channel is reciprocal, the base station may estimate a difference between a first RSRP associated with the first downlink beam and a second RSRP associated with a second downlink beam of the plurality of downlink beams based on respective uplink signal quality measurements of a first uplink beam corresponding to the first downlink beam and a second uplink beam corresponding to the second downlink beam. For example, the beam management circuitry 1246 shown and described above in connection with FIG. 12 may estimate the RSRP difference.

At block 1506, the base station may switch from the first downlink beam to the second downlink beam of the plurality of downlink beams. Switching may enable the BS to communicate with the UE based on the estimated difference between the first RSRP associated with the first downlink beam and the second RSRP associated with the second downlink beam. For example, the beam management circuitry 1246 shown and described above in connection with FIG. 12 may switch to the second downlink beam based on the RSRP difference.

At block 1508, the base station may modify an MCS utilized for communication with the UE based on the difference between the first RSRP and the second RSRP. The modified MCS may be utilized for communication with the UE on the second beam immediately after switching from the first beam to the second beam (e.g., in the first slot after switching). For example, the MCS selection circuitry 1248 shown and described above in connection with FIG. 12 may modify the MCS.

Figure 16:
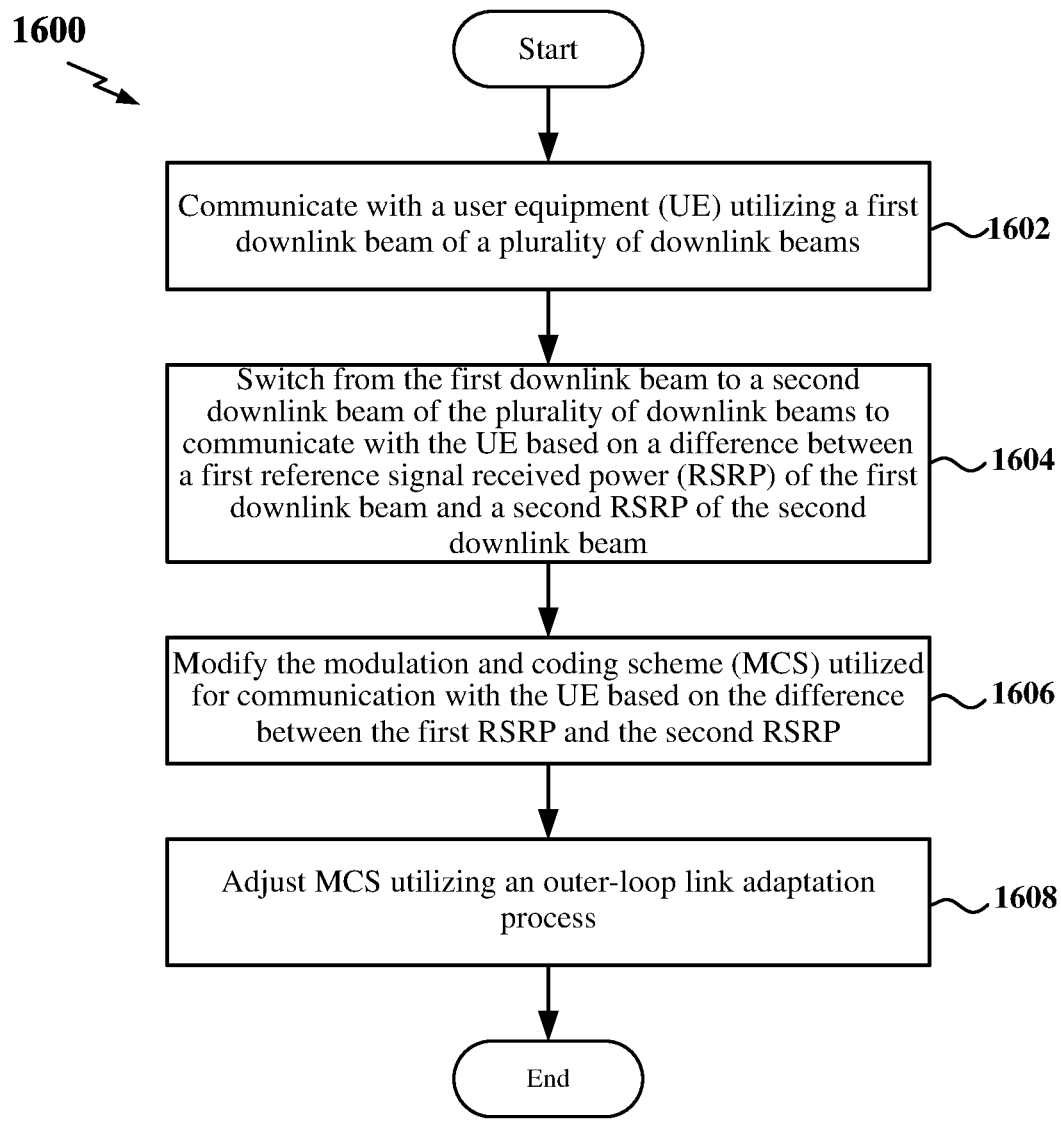
FIG. 16 is a flow chart of another exemplary method for a base station to minimize BLER associated with a beam switch according to some aspects.

FIG. 16 is a flow chart 1600 of a method for a base station to minimize BLER associated with a beam switch. As described below, some or all illustrated features may be omitted in a particular implementation within the scope of the present disclosure, and some illustrated features may not be required for implementation of all embodiments. In some examples, the method may be performed by the base station 1200, as described above and illustrated in FIG. 12, by a processor or processing system, or by any suitable means for carrying out the described functions.

At block 1602, the base station may communicate with a UE utilizing a first downlink beam of a plurality of downlink beams. The downlink beams may be, for example, mmWave or sub-6 GHz beams. For example, the communication and processing circuitry 1244 and beam management circuitry 1246 shown and described above in connection with FIG. 12 may communicate with the UE utilizing a first downlink beam.

At block 1604, the base station may switch from the first downlink beam to a second downlink beam of the plurality of downlink beams to communicate with the UE. In some examples, the base station may switch to the second downlink beam based on a difference between a first RSRP associated with the first downlink beam and a second RSRP associated with the second downlink beam. For example, the base station may calculate the RSRP difference based on a beam measurement report including the first RSRP associated with the first downlink beam and the second RSRP associated with the second downlink beam. As another example, the base station may estimate the RSRP difference between the first and second downlink beams based on uplink signal quality measurements of corresponding first and second uplink beams. For example, the beam management circuitry 1246 shown and described above in connection with FIG. 12 may determine the RSRP difference between the first and second downlink beams and switch to the second downlink beam based on the RSRP difference.

At block 1606, the base station may modify an MCS utilized for communication with the UE based on the difference between the first RSRP and the second RSRP. The modified MCS may be utilized for communication with the UE on the second beam immediately after switching from the first beam to the second beam (e.g., in the first slot after switching). For example, the MCS selection circuitry 1248 shown and described above in connection with FIG. 12 may modify the MCS.

At block 1608, the base station may further adjust the MCS utilizing an outer-loop link adaptation process. For example, the base station may be configured to adjust the MCS based on the HARQ feedback (e.g., ACKs and NACKs) received from the UE. For example, the link adaptation circuitry 1250 shown and described above in connection with FIG. 12 may further adjust the MCS after modifying the MCS based on the RSRP difference.

Figure 17:
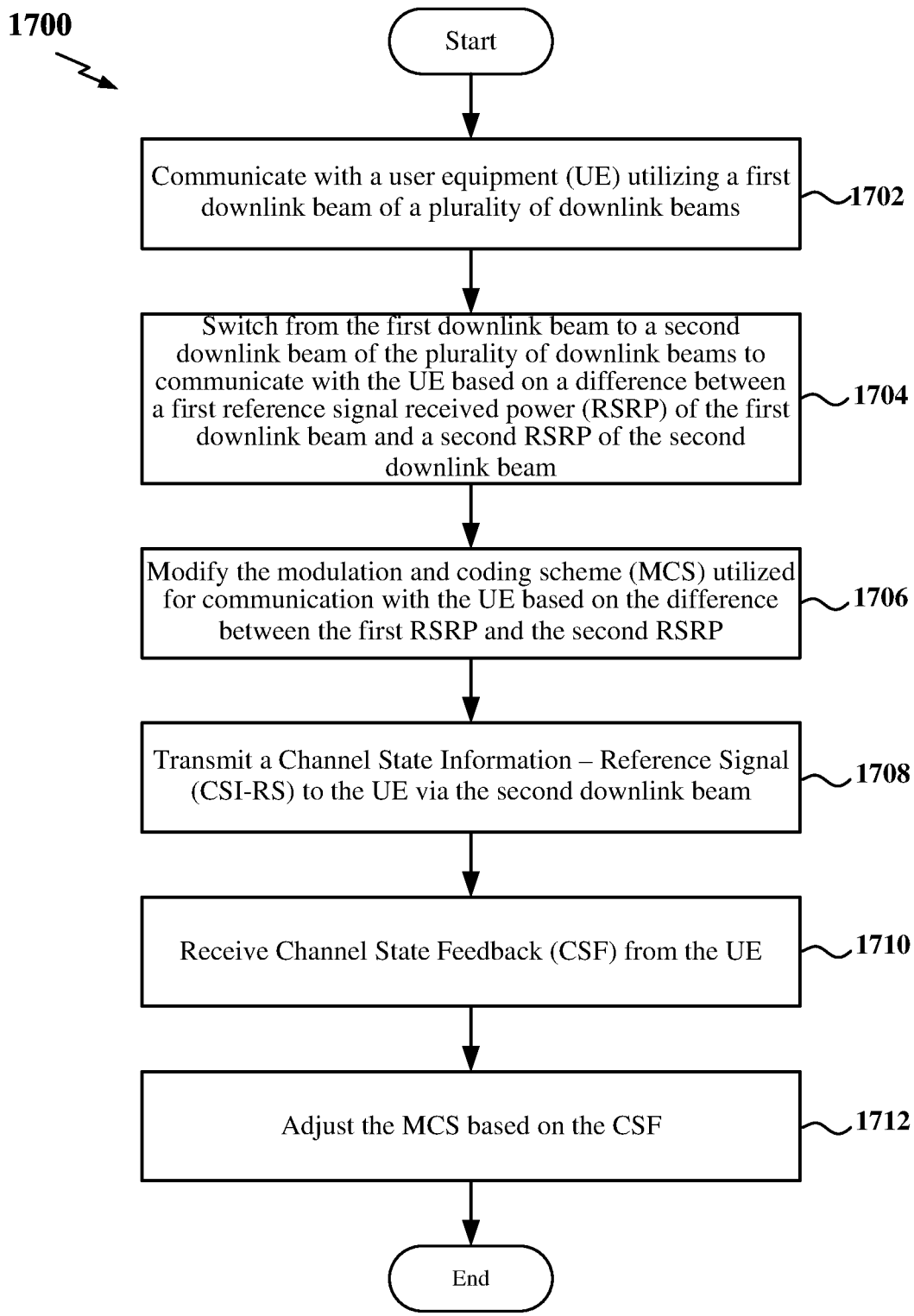
FIG. 17 is a flow chart of another exemplary method for a base station to minimize BLER associated with a beam switch according to some aspects.

FIG. 17 is a flow chart 1700 of a method for a base station to minimize BLER associated with a beam switch. As described below, some or all illustrated features may be omitted in a particular implementation within the scope of the present disclosure, and some illustrated features may not be required for implementation of all embodiments. In some examples, the method may be performed by the base station 1200, as described above and illustrated in FIG. 12, by a processor or processing system, or by any suitable means for carrying out the described functions.

At block 1702, the base station may communicate with a UE utilizing a first downlink beam of a plurality of downlink beams. The downlink beams may be, for example, mmWave or sub-6 GHz beams. For example, the communication and processing circuitry 1244 and beam management circuitry 1246 shown and described above in connection with FIG. 12 may communicate with the UE utilizing a first downlink beam.

At block 1704, the base station may switch from the first downlink beam to a second downlink beam of the plurality of downlink beams to communicate with the UE. In some examples, the base station may switch to the second downlink beam based on a difference between a first RSRP associated with the first downlink beam and a second RSRP associated with the second downlink beam. For example, the base station may calculate the RSRP difference based on a beam measurement report including the first RSRP associated with the first downlink beam and the second RSRP associated with the second downlink beam. As another example, the base station may estimate the RSRP difference between the first and second downlink beams based on uplink signal quality measurements of corresponding first and second uplink beams. For example, the beam management circuitry 1246 shown and described above in connection with FIG. 12 may determine the RSRP difference between the first and second downlink beams and switch to the second downlink beam based on the RSRP difference.

At block 1706, the base station may modify an MCS utilized for communication with the UE based on the difference between the first RSRP and the second RSRP. The modified MCS may be utilized for communication with the UE on the second beam immediately after switching from the first beam to the second beam (e.g., in the first slot after switching). For example, the MCS selection circuitry 1248 shown and described above in connection with FIG. 12 may modify the MCS.

At block 1708, the base station may transmit a CSI-RS to the UE via the second downlink beam. For example, the communication and processing circuitry 1244, together with the transceiver 1210, shown and described above in connection with FIG. 12 may transmit the CSI-RS to the UE on the second beam.

At block 1710, the base station may receive CSF from the UE based on the CSI-RS. For example, the communication and processing circuitry 1244, together with the transceiver 1210, shown and described above in connection with FIG. 12 may receive the CSF.

At block 1712, the base station may further adjust the MCS based on the CSF. For example, the base station may be configured to adjust the MCS based on the CQI included in the CSF. For example, the link adaptation circuitry 1250 shown and described above in connection with FIG. 12 may further adjust the MCS after modifying the MCS based on the RSRP difference.

In one configuration, a base station includes means for communicating with a user equipment (UE) utilizing a first downlink beam of a plurality of downlink beams, means for switching from the first downlink beam to a second downlink beam of the plurality of downlink beams to communicate with the UE based on a difference between a first reference signal received power (RSRP) associated with the first downlink beam and a second RSRP associated with the second downlink beam, and means for modifying a modulation and coding scheme (MCS) utilized for communication with the UE based on the difference between the first RSRP and the second RSRP.

In one aspect, the aforementioned means for communicating with a user equipment (UE) utilizing a first downlink beam of a plurality of downlink beams, means for switching from the first downlink beam to a second downlink beam of the plurality of downlink beams to communicate with the UE based on a difference between a first reference signal received power (RSRP) associated with the first downlink beam and a second RSRP associated with the second downlink beam, and means for modifying a modulation and coding scheme (MCS) utilized for communication with the UE based on the difference between the first RSRP and the second RSRP may be the processor(s) 1204 shown in FIG. 12 configured to perform the functions recited by the aforementioned means. For example, the aforementioned means for communicating with a user equipment (UE) utilizing a first downlink beam of a plurality of downlink beams may include the communication and processing circuitry 1244, beam management circuitry 1246, transceiver 1210, and antenna array 1220 shown in FIG. 12. As another example, the aforementioned means for switching from the first downlink beam to a second downlink beam of the plurality of downlink beams to communicate with the UE based on a difference between a first reference signal received power (RSRP) associated with the first downlink beam and a second RSRP associated with the second downlink beam may include the beam management circuitry 1246 shown in FIG. 12. In another example, the aforementioned means for modifying a modulation and coding scheme (MCS) utilized for communication with the UE based on the difference between the first RSRP and the second RSRP may include the MCS selection circuitry 1248 and link adaptation circuitry 1250 shown in FIG. 12. In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-8, 11, and 12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a base station in a wireless communication network, the method comprising:

communicating with a user equipment (UE) utilizing a first downlink beam of a plurality of downlink beams;

switching from the first downlink beam to a second downlink beam of the plurality of downlink beams to communicate with the UE based on a difference between a first reference signal received power (RSRP) associated with the first downlink beam and a second RSRP associated with the second downlink beam;

modifying a modulation and coding scheme (MCS) utilized for communication with the UE based on the difference between the first RSRP and the second RSRP; and reducing, based on the modified MCS, a link adaptation convergence period in which:

a block error rate (BLER) burst occurs when the second RSRP is higher than the first RSRP; and a reduction in throughput occurs when the second RSRP is lower than the first RSRP.

2. The method of claim 1, further comprising:

receiving at least one beam measurement report from the UE, wherein the first RSRP and the second RSRP are each included in one of the at least one beam measurement report; and calculating the difference between the first RSRP and the second RSRP based on the at least one beam measurement report.

3. The method of claim 1, further comprising:

estimating the difference between the first RSRP and the second RSRP based on respective signal quality measurements of a first uplink beam corresponding to the first downlink beam and a second uplink beam corresponding to the second downlink beam.

4. The method of claim 1, wherein modifying the MCS further comprises:

adjusting the MCS utilizing an outer-loop link adaptation process.

5. The method of claim 4, further comprising:

receiving acknowledgement information from the UE; and adjusting the MCS based on the acknowledgement information.

6. The method of claim 1, wherein modifying the MCS further comprises:

transmitting a channel state information—reference signal (CSI-RS) to the UE via the second beam;

receiving channel state information feedback (CSF) from the UE; and adjusting the MCS based on the CSF.

7. The method of claim 1, wherein the first downlink beam comprises a first beam width and the second downlink beam comprises a second beam width, wherein the second beam width is different than the first beam width.

8. The method of claim 1, wherein communicating with the UE further comprises:

communicating with the UE utilizing a millimeter wave carrier frequency.

9. A base station for wireless communication network, comprising:

a wireless transceiver;

a memory; and a processor coupled to the wireless transceiver and the memory, wherein the processor is configured to:

communicate with a user equipment (UE) utilizing a first downlink beam of a plurality of downlink beams via the wireless transceiver;

switch from the first downlink beam to a second downlink beam of the plurality of downlink beams to communicate with the UE based on a difference between a first reference signal received power (RSRP) associated with the first downlink beam and a second RSRP associated with the second downlink beam;

modify a modulation and coding scheme (MCS) utilized for communication with the UE based on the difference between the first RSRP and the second RSRP; and reduce, based on the modified MCS, a link adaptation convergence period in which:

a block error rate (BLER) burst occurs when the second RSRP is higher than the first RSRP; and a reduction in throughput occurs when the second RSRP is lower than the first RSRP.

10. The base station of claim 9, wherein the processor is further configured to:

receive at least one beam measurement report from the UE via the wireless transceiver, wherein the first RSRP and the second RSRP are each included in one of the at least one beam measurement report; and calculate the difference between the first RSRP and the second RSRP based on the at least one beam measurement report.

11. The base station of claim 9, wherein the processor is further configured to:

estimate the difference between the first RSRP and the second RSRP based on respective signal quality measurements of a first uplink beam corresponding to the first downlink beam and a second uplink beam corresponding to the second downlink beam.

12. The base station of claim 9, wherein the processor is further configured to:

adjust the MCS utilizing an outer-loop link adaptation process.

13. The base station of claim 12, wherein the processor is further configured to:

receive acknowledgement information from the UE; and adjust the MCS based on the acknowledgement information.

14. The base station of claim 9, wherein the processor is further configured to:

transmit a channel state information—reference signal (CSI-RS) to the UE via the second beam;

receive channel state information feedback (CSF) from the UE; and adjust the MCS based on the CSF.

15. The base station of claim 9, wherein the first downlink beam comprises a first beam width and the second downlink beam comprises a second beam width, wherein the second beam width is different than the first beam width.

16. The base station of claim 9, wherein the processor is further configured to:

communicate with the UE utilizing a millimeter wave carrier frequency via the wireless transceiver.

17. A base station for wireless communication, comprising:

means for communicating with a user equipment (UE) utilizing a first downlink beam of a plurality of downlink beams;

means for switching from the first downlink beam to a second downlink beam of the plurality of downlink beams to communicate with the UE based on a difference between a first reference signal received power (RSRP) associated with the first downlink beam and a second RSRP associated with the second downlink beam;

means for modifying a modulation and coding scheme (MCS) utilized for communication with the UE based on the difference between the first RSRP and the second RSRP; and means for reducing, based on the modified MCS, a link adaptation convergence period in which:

a block error rate (BLER) burst occurs when the second RSRP is higher than the first RSRP; and a reduction in throughput occurs when the second RSRP is lower than the first RSRP.

18. The base station of claim 17, further comprising:

means for receiving at least one beam measurement report from the UE, wherein the first RSRP and the second RSRP are each included in one of the at least one beam measurement report; and means for calculating the difference between the first RSRP and the second RSRP based on the at least one beam measurement report.

19. The base station of claim 17, further comprising:

means for estimating the difference between the first RSRP and the second RSRP based on respective signal quality measurements of a first uplink beam corresponding to the first downlink beam and a second uplink beam corresponding to the second downlink beam.

20. The base station of claim 17, wherein the means for modifying the MCS further comprises:

means for adjusting the MCS utilizing an outer-loop link adaptation process.

21. The base station of claim 20, wherein the means for modifying the MCS further comprises:

means for receiving acknowledgement information from the UE; and means for adjusting the MCS based on the acknowledgement information.

22. The base station of claim 17, wherein the means for modifying the MCS further comprises:

means for transmitting a channel state information —reference signal (CSI-RS) to the UE via the second beam;

means for receiving channel state information feedback (CSF) from the UE; and means for adjusting the MCS based on the CSF.

23. The base station of claim 17, wherein the first downlink beam comprises a first beam width and the second downlink beam comprises a second beam width, wherein the second beam width is different than the first beam width.

24. The base station of claim 17, wherein the means for communicating with the UE further comprises:

means for communicating with the UE utilizing a millimeter wave carrier frequency.

25. A non-transitory computer-readable medium storing computer-executable code, comprising code for causing a base station to:

communicate with a user equipment (UE) utilizing a first downlink beam of a plurality of downlink beams;

switch from the first downlink beam to a second downlink beam of the plurality of downlink beams to communicate with the UE based on a difference between a first reference signal received power (RSRP) associated with the first downlink beam and a second RSRP associated with the second downlink beam;

modify a modulation and coding scheme (MCS) utilized for communication with the UE based on the difference between the first RSRP and the second RSRP; and reduce, based on the modified MCS, a link adaptation convergence period in which:

a block error rate (BLER) burst occurs when the second RSRP is higher than the first RSRP; and a reduction in throughput occurs when the second RSRP is lower than the first RSRP.

26. The non-transitory computer-readable medium of claim 25, further comprising code for causing the base station to:

receive at least one beam measurement report from the UE, wherein the first RSRP and the second RSRP are each included in one of the at least one beam measurement report; and calculate the difference between the first RSRP and the second RSRP based on the at least one beam measurement report.

27. The non-transitory computer-readable medium of claim 25, further comprising code for causing the base station to:

estimate the difference between the first RSRP and the second RSRP based on respective signal quality measurements of a first uplink beam corresponding to the first downlink beam and a second uplink beam corresponding to the second downlink beam.

28. The non-transitory computer-readable medium of claim 26, further comprising code for causing the base station to:

adjust the MCS utilizing an outer-loop link adaptation process.

29. The non-transitory computer-readable medium of claim 28, further comprising code for causing the base station to:

receive acknowledgement information from the UE; and adjust the MCS based on the acknowledgement information.

30. The non-transitory computer-readable medium of claim 25, further comprising code for causing the base station to:

transmit a channel state information —reference signal (CSI-RS) to the UE via the second beam;

receive channel state information feedback (CSF) from the UE; and adjust the MCS based on the CSF.

* * * * *